(12) United States Patent
Senda

(10) Patent No.: US 7,940,312 B2
(45) Date of Patent: May 10, 2011

(54) IMAGE PICKUP DEVICE FOR CONNECTION TO AN EXTERNAL RECORD DEVICE

(75) Inventor: Ayumi Senda, Tokyo (JP)

(73) Assignee: Sony Corporation (JP)

( * ) Notice: Subject to any disclaimer, the term of this patent is extended or adjusted under 35 U.S.C. 154(b) by 666 days.

(21) Appl. No.: 10/587,117

(22) PCT Filed: Nov. 18, 2005

(86) PCT No.: PCT/JP2005/021275
§ 371 (c)(1),
(2), (4) Date: Jul. 24, 2006

(87) PCT Pub. No.: WO2006/061983
PCT Pub. Date: Jun. 15, 2006

(65) Prior Publication Data
US 2008/0273096 A1   Nov. 6, 2008

(30) Foreign Application Priority Data

Dec. 6, 2004   (JP) .............................. P2004-352581

(51) Int. Cl.
*H04N 5/76* (2006.01)
*H04N 5/225* (2006.01)
(52) U.S. Cl. .................. 348/231.1; 348/207.1
(58) Field of Classification Search .............. 348/207.1, 348/231.99, 231.1, 231.2, 231.9, 231.8
See application file for complete search history.

(56) References Cited

U.S. PATENT DOCUMENTS

| | | | | |
|---|---|---|---|---|
| 5,815,201 | A * | 9/1998 | Hashimoto et al. | 348/231.4 |
| 6,111,604 | A * | 8/2000 | Hashimoto et al. | 348/220.1 |
| 6,256,059 | B1 * | 7/2001 | Fichtner | 348/222.1 |
| 6,297,870 | B1 | 10/2001 | Nanba | |
| 6,429,896 | B1 * | 8/2002 | Aruga et al. | 348/231.99 |
| 6,462,508 | B1 * | 10/2002 | Wang et al. | 320/107 |
| 6,538,692 | B2 * | 3/2003 | Niwa | 348/231.1 |
| 6,661,462 | B2 * | 12/2003 | Ohnogi | 348/372 |
| 6,832,275 | B1 * | 12/2004 | Aizawa | 710/62 |
| 7,054,248 | B2 * | 5/2006 | Wakui | 369/47.36 |
| 7,119,835 | B2 * | 10/2006 | Gennetten et al. | 348/207.2 |
| 7,167,206 | B2 * | 1/2007 | Kayanuma | 348/375 |
| 7,170,551 | B2 * | 1/2007 | Fichtner | 348/207.1 |
| 7,177,528 | B1 * | 2/2007 | Yada et al. | 386/111 |
| 7,382,398 | B2 * | 6/2008 | Koyama | 348/207.1 |

(Continued)

FOREIGN PATENT DOCUMENTS

JP    06022259 A  *  1/1994

(Continued)

*Primary Examiner* — John M Villecco
(74) *Attorney, Agent, or Firm* — Lerner, David, Littenberg, Krumholz & Mentlik, LLP

(57) ABSTRACT

Charging of a camera 100 and backup of data are concurrently executed to enable picking up an image regardless of a remaining available memory. As the camera 100 is attached to a cradle 200, image data for the image picked up by a camera module 110 of the camera 100 is directly transferred to and recorded in a HDD 220 of the cradle 200. Image data, already recorded in the flash memory 133 of the camera 100, is backed up by the HDD 220 of the cradle 200. Further, the cradle 200 allows a charging circuit 204 to charge a rechargeable battery of the camera 100 using electric power supplied via an AC cord 280. Also, the cradle 200 has a tripod bore 270 through which the camera is fixed to a tripod for picking up the image.

13 Claims, 12 Drawing Sheets

U.S. PATENT DOCUMENTS

| | | | |
|---|---|---|---|
| 7,417,685 B2* | 8/2008 | Tsuji | 348/375 |
| 7,432,963 B2* | 10/2008 | Chosa | 348/231.1 |
| 7,612,806 B2* | 11/2009 | Kazami et al. | 348/231.1 |
| 2002/0051629 A1* | 5/2002 | Endo | 386/113 |
| 2003/0160890 A1* | 8/2003 | Caspe et al. | 348/372 |
| 2004/0021669 A1* | 2/2004 | Fredlund et al. | 345/530 |
| 2004/0257464 A1* | 12/2004 | Pandit et al. | 348/373 |
| 2006/0023069 A1* | 2/2006 | Saito | 348/207.99 |
| 2006/0244833 A1* | 11/2006 | Abe et al. | 348/207.1 |

FOREIGN PATENT DOCUMENTS

| | | | |
|---|---|---|---|
| JP | 08069684 A | * | 3/1996 |
| JP | 08203192 A | * | 8/1996 |
| JP | 10-172237 A | | 6/1998 |
| JP | 11-308562 A | | 11/1999 |
| JP | 2000069341 A | * | 3/2000 |
| JP | 2000137796 A | * | 5/2000 |
| JP | 2002-209175 | | 7/2002 |
| JP | 2003-169243 A | | 6/2003 |
| JP | 2003233957 A | * | 8/2003 |
| JP | 2004-096623 A | | 3/2004 |
| JP | 2004-158149 A | | 6/2004 |
| JP | 2004242356 A | * | 8/2004 |
| JP | 2004-328034 A | | 11/2004 |
| JP | 2004-328074 A | | 11/2004 |
| JP | 2004312632 A | * | 11/2004 |

* cited by examiner

IMAGE PICKUP DEVICE FOR CONNECTION TO AN EXTERNAL RECORD DEVICE

TECHNICAL FIELD

The present invention relates to image pickup devices and, more particularly, an image pickup device for saving data of pickup moving images and still images in given record medium, an external record device for connection to the image pickup device, an image pickup system and related processing method and a program operative to allow a computer to execute the related method.

BACKGROUND ART

In related art, with a digital still camera or the like, for the purpose of saving a pickup image, not only a flash memory incorporated in a body of the digital still camera but also external record medium such as detachable flash memory or a hard disk or the like have been used. Even though these external record media have storage capacities increasing year by year, due to limitations, a need has arisen for image data to be transferred to an outside information record device such as a computer or the like whose memory is used up and, subsequently, an available memory to be ensured upon deleting data recorded in the external record medium.

However, in such a case, for merely backing up data, the computer has to be started up to allow the body of the digital still camera or an external record device, demounted from the digital still camera, to be connected to the computer. In general, it takes time in startup of the computer. Therefore, the backup for data has encountered troublesome work for a user.

Lately, proposals have heretofore been made to provide a mount or a cradle (hereinafter referred to as a cradle) that has not only a function to charge a rechargeable battery of the body of the digital still camera but also a function to transfer data, recorded in the flash memory or the like incorporated in the digital still camera, to the computer when the body of the digital still camera is placed in a given position or when the rechargeable battery of the body of the digital still camera begins to be charged.

However, even if such a cradle is used, since data cannot be transferred unless the computer has started up, the cradle is equivalent to a mere charging device with the resultant difficulty in addressing troublesome work that needs to start up the computer.

Therefore, an external record device has heretofore been proposed which incorporates record medium with high capacity such as a hard disk or the like to simply back up data of still images and moving images picked up by an image pickup device (see, for instance, Japanese Patent Laid-Open Publication No. 2002-209175 (FIG. 1)).

The invention disclosed in Japanese Patent Laid-Open Publication No. 2002-209175 contemplates that as the image pickup device is attached to the external record device, the external record device reads out data of the still images and the moving images from a record medium incorporated in the image pickup device to allow retrieved data to be written to record medium incorporated in the external record device while erasing data of record medium incorporated in the image pickup device.

However, the image pickup device of the related art mentioned above is based on the premise that a single piece of the image pickup device picks up an image and data of the picked up still images and moving images are saved in the record medium of the image pickup device upon which when needed to erase saved data backup, the image pickup device is mounted to the external record device, and no consideration has been taken to perform the image pickup under a status mounted to the external record device.

Accordingly, when picking up the image pickup, the image pickup cannot be done at a time till a memory of record medium of the image pickup device. Therefore, a need has arisen to back up data, recorded once upon interrupting picking up the image, in the external record device for each reduction in the remaining memory capacity of record medium to a record capacity needed for newly recording data.

In such a way, with the related art image pickup device, record medium has a limited capacity for picking up the image and when intended to erase data after backing up data of saved still images and moving images in the external record device, the shooting has to be interrupted once. Therefore, an issue arises with the occurrence of a lack in mobility. Further, due to the limitation in the capacity of the record medium of the image pickup device, an issue arises with a probability suffering from a difficulty in continuously shooting of still images with high capacity and picking up moving images with high capacity.

It is therefore an object of the present invention to enable picking up an image while concurrently backing up data without causing interruption even if a remaining available memory of a record medium of an image pickup device becomes less than a record capacity needed for newly recording data of still images and moving images.

DISCLOSURE OF INVENTION

The present invention has been made to address the above issues and has one aspect to provide an image pickup device for picking up an image of a given subject, comprising image pickup means for picking up the image, control means for permitting image data, corresponding to the image picked up by the image pickup means, to be recorded in a given record medium or a given external record device, connection means for connection to the external record device, connection detecting means for detecting a connection to the external record device through the connection means, and transfer processing means controlled by the control means for transferring the image data, recorded in the record medium, to the external record device when the connection detection means detects the connection to the external record device. This results in an effect to allow image data to be appropriately recorded in either record medium of the image pickup device or the external record device under a situation where the image pickup device and the external record device are connected to each other.

Further, with the first aspect of the present invention, the control means allows the image data, corresponding to the image picked up by the image pickup device, to be recorded in the external record device during a period in which the connection means connects the image pickup device to the external record device. This provides an effect to allow images to be continuously picked without minding an available memory of record medium.

Furthermore, with the first aspect of the present invention, the image pickup device may further comprise judgment means for making judgment depending on a size of the image data and an available memory of the record medium whether or not the record medium is able to store the image data, wherein the control means allows the image data to be recorded in the record medium or to be transferred to the external record device through the transfer processing means depending on a judgment result of the judgment means. This provides an effect to allow image data to be recorded in either one of record medium and the external record device on a priority basis.

Moreover, with the first aspect of the present invention, the control means may allow the image data to be recorded in the record medium regardless of whether or not the image pickup device is connected to the external record device by the connection means when the judgment means makes judgment that the record device is able to record the image data. This provides an effect to record image data in record medium on a priority basis.

Additionally, with the first aspect of the present invention, the control means may be operative such that under a situation where the image pickup device is connected to the external record device through the connection means when the image data is recorded in the record medium under a given file name, other image data related to the image data is recorded in the external record device under another file name for consolidation to the image data recorded under the given file name. This provides an effect for related files to be consolidated into one file.

A second aspect of the present invention provides an external record device comprising connection means connectable to an image pickup device, connection detecting means for detecting that the image pickup device is connected by the connection means, readout means for reading out image data, picked up by the image pickup means, through the connection means when the connection detecting means detects that the image pickup device is connected by the connection means, and saving means for saving the image data read out by the readout means. This provides an effect for an image to be continuously picked up without minding an available memory of record medium upon saving image data picked up by the image pickup device.

Further, with the second aspect of the present invention, the saving means may comprise a hard disk device and the external record device may further comprise speed control means for decreasing a rotational speed of a platter forming the hard disk device when a voice is recorded under a condition in which the image pickup device is connected. This provides an effect of minimizing a noise sound generated by the hard disk device to suppress the noise sound from being recorded.

A third aspect of the present invention provides in an image pickup system having an image pickup device for picking up an image of a given subject and an external record device for saving the image picked up by the image pickup device, the image pickup device comprises image pickup means for picking up the image, control means for allowing image data, corresponding to the image picked up by the image pickup means, to be recorded in a given record medium or a given external record device, first connection means connectable to the external record device, first connection detecting means for detecting that the image pickup device is connected to the external saving means through the connection means, and transfer processing means controlled by the control means for transferring the image data, recorded in the record medium, to the external record device when the first connection detection means detects that the external record device is connected by the first connection means, and the external record device comprises second connection means connectable to an image pickup device, second connection detecting means for detecting that the image pickup device is connected by the connection means, and saving means for saving the image data, transferred by the transfer processing means, and the image data picked up by the image pickup means when the second connection detecting means detects that the image pickup device is connected by the second connection means.

A fourth aspect of the present invention provides a control method for an image pickup system having an image pickup device for picking up an image of a given subject and an external record device operative to be connected to the image pickup device, the control method comprising step of detecting whether or not the image pickup device is connected to the external record device, step of transferring image data, corresponding to the image, from a given record medium of the image pickup device to the external record device when the image pickup device is connected to the external record device, step of recording the image data in the external record device if the image pickup device is connected to the external record device when an image pickup is commanded, and step of recording the image data in the record medium of the image pickup device if the image pickup device is not connected to the external record device when the image pickup is commanded. This provides an effect wherein image data can be recorded in the external record device under the situation where the image pickup device and the external record device are connected to each other and images can be continuously picked up without minding an available memory of record medium.

A fifth aspect of the present invention provides a control method for an image pickup system having an image pickup device for picking up an image of a given subject and an external record device operative to be connected to the image pickup device, the control method comprising, step of detecting whether or not the image pickup device is connected to the external record device, step of transferring image data, corresponding to the image, from a given record medium of the image pickup device to the external record device when the image pickup device is connected to the external record device, step of detecting an overflow in the record medium of the image pickup device, step of recording the image data in the external record device if the image pickup device is connected to the external record device and the overflow occurs in the record medium when the image pickup is commanded, and step of recording the image data in the record medium of the image pickup device if no overflow occurs in the record medium even with the image pickup device being connected to the external record device when the image pickup is commanded. This provides an effect wherein data is continuously recorded in record medium under a situation where the image pickup device and the external record device are connected to each other and recorded in the external record device in the presence of an overflow in record medium.

A sixth aspect of the present invention provides a control method for an image pickup system having an image pickup device for picking up an image of a given subject and a hard disk device operative to be connected to the image pickup device, the control method comprising step of detecting whether or not the image pickup device is connected to the hard disk device, step of detecting that the image pickup device has a voice input, and step of recording the image data upon decreasing a platter rotational speed of the hard disk device if the image pickup device is connected to the hard disk device and the image pickup device has the voice input when the image pickup is commanded. This provides an effect of minimizing a noise sound generated by the hard disk device for suppressing the recording of the noise sound.

A seventh aspect of the present invention provides a program executable in a computer for an image pickup system having an image pickup device for picking up an image of a given subject and an external record device operative to be connected to the image pickup device, comprising step of detecting whether or not the image pickup device is connected to the external record device, step of transferring image data, corresponding to the image, from a given record medium of the image pickup device to the external record device when the image pickup device is connected to the external record device, step of recording the image data in the external record device if the image pickup device is connected to the external record device when the image pickup is commanded, and step of recording the image data in the record medium of the image pickup device if the image pickup device is not connected to the external record device when the image pickup is commanded. This provides an effect wherein data is recorded in the external record device under a situation where the image pickup device and the external record device are connected to each other and images can be continuously picked up without minding an available memory of record medium.

An eighth aspect of the present invention provides a program executable in a computer for an image pickup system having an image pickup device for picking up an image of a given subject and an external record device operative to be connected to the image pickup device, comprising step of detecting whether or not the image pickup device is connected to the external record device, step of transferring image data, corresponding to the image, from a given record medium of the image pickup device to the external record device when the image pickup device is connected to the external record device, step of detecting an overflow in the record medium of the image pickup device, step of recording the image data in the external record device if the image pickup device is connected to the external record device and the overflows occurs in the record medium when the image pickup is commanded, and step of recording the image data in the record medium of the image pickup device if no overflow occurs in the record medium even with the image pickup device being connected to the external record device when the image pickup is commanded. This provides an effect wherein data is continuously recorded in record medium under a situation where the image pickup device and the external record device are connected to each other and recorded in the external record device in the presence of an overflow in record medium.

A ninth aspect of the present invention provides a program executable in a computer for an image pickup system having an image pickup device for picking up an image of a given subject and a hard disk device operative to be connected to the image pickup device, the control method comprising step of detecting whether or not the image pickup device is connected to the hard disk device, step of detecting that the image pickup device has a voice input, and step of recording the image data upon decreasing a platter rotational speed of the hard disk device if the image pickup device is connected to the hard disk device and the image pickup device has the voice input when the image pickup is commanded. This provides an effect of minimizing a noise sound generated by the hard disk device for suppressing the recording of the noise sound.

According to the present invention, an excellent advantage can be provided wherein even if a shortage occurs in a remaining available memory of record medium incorporated in the image pickup device during shooting on camera, images can be continuously picked up without causing interruption in the shooting while enabling backup of data such as still images and moving images saved in record medium.

BEST MODE FOR CARRYING OUT THE INVENTION

Now, various embodiments of the present invention are described in detail with reference to the accompanying drawings.

Figure 1:
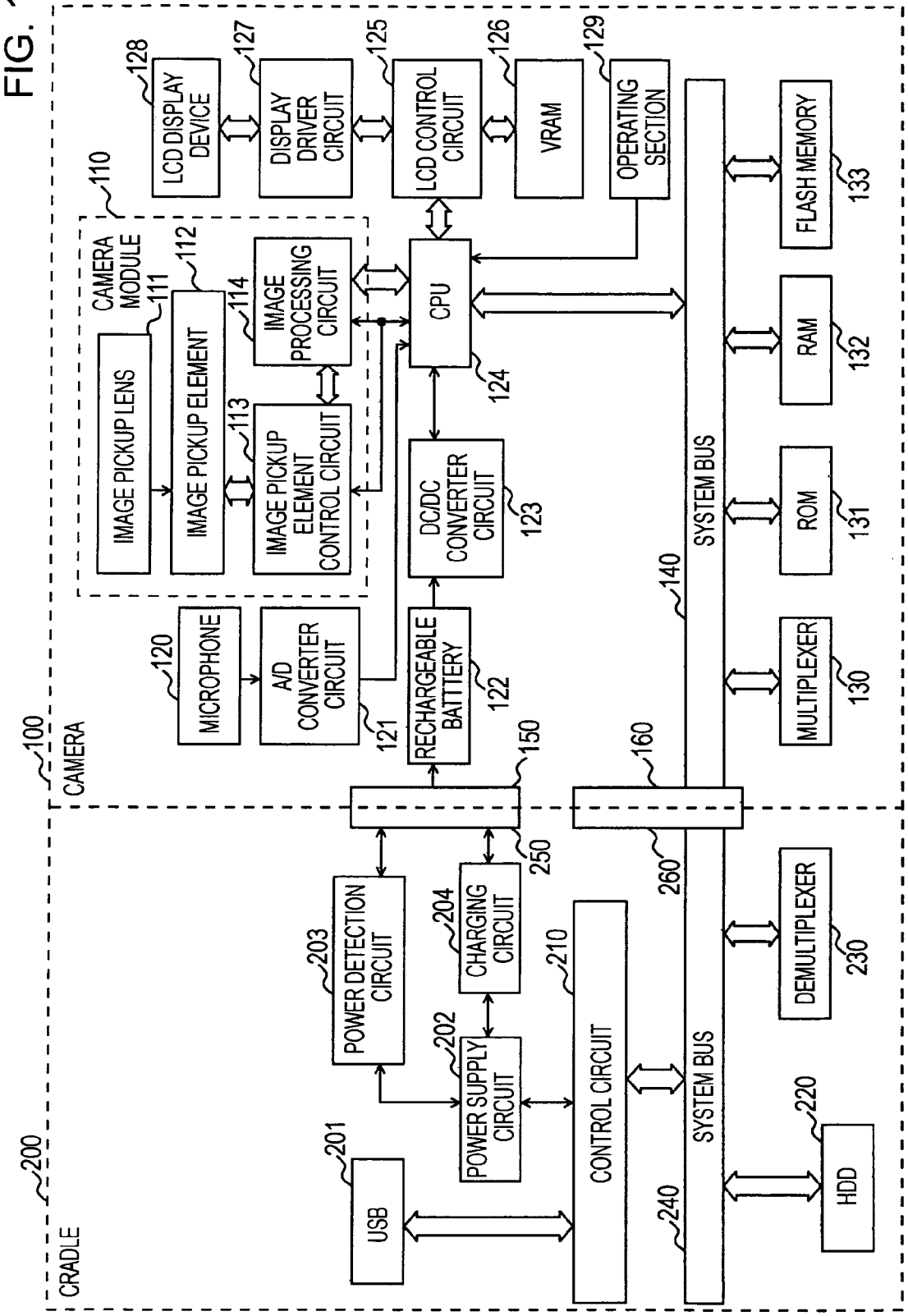
FIG. 1 is a block diagram showing structural examples a camera 100 and a cradle 200 of an embodiment according to the present invention.

FIG. 1 is a block diagram showing structural examples of a camera 100 and a cradle 200 of an embodiment according to the present invention.

The camera 100 is comprised of a camera module 110, a microphone 120, an AD (Analog/Digital) converter circuit 121, a rechargeable battery 122, a DC (Direct Current)/DC converter 123, a CPU (Central Processing Unit) 124, an LCD (Liquid Crystal Display) control circuit 125, a VRAM (Video Random Access Memory) 126, a display driver circuit 127, an LCD display device 128 and an operating section 129.

Further, the camera 100 includes a multiplexer 130, a ROM (Read On Memory) 131, a RAM (Random Access Memory) 132, a flash memory 133, a system bus 140, a power connector 150 and a data connector 160.

The camera module 110 picks up a still image and a moving image to supply image data, corresponding to the pickup still image and moving image, to the CPU 124. As used herein, the term "still image and moving image" refers to as "image data". Further, the image involving voice data refers merely to "image data". Furthermore, the camera module 110 is comprised of an image pickup lens 111, an image pickup device 112, an image-pickup device control circuit 113 and an image processing circuit 114.

The image pickup lens 111 forms an optical image of a subject on the image pickup device 112. The image pickup device 112 is constructed of a CCD (Charge Coupled Device) or the like and converts an optical image resulting from the image pickup lens 111 to an electric signal for output as an image signal.

The image-pickup device control circuit 113 is comprised of a timing generation circuit that supplies a transfer clock signal and a shutter signal (not shown) to the image pickup device 112, a CDS (Correlation Double Sampling)/AGC (Analog Gain Control) circuit (not shown) for conducting noise suppression and gain control on the image signal output from the image pickup device 112, and an A/D converter (not shown) for converting an analog output of the CDS/AGC circuit to a digital signal with 10 bits.

Then, the image-pickup device control circuit 113 outputs image data with 30 frames at all times for one second. The image processing circuit 114 performs image processing on image data output from the image-pickup device control circuit 113 for white-balance adjustment and exposure adjustment to allow image data, subjected to image processing, to be converted to data in the format of YCbCr to be output.

The CPU 124 controls various parts in accordance with various control programs registered in the ROM 131 and executes image compression and expansion on image data supplied from the image processing circuit 114 of the camera module 110 using JPEG (Joint Photographic Experts Group) and MPEG (Moving Picture Experts Group).

The ROM 131 records various control programs to be executed by the CPU 124 and initial setting information on folders. These control programs include a control program for transferring image data output from the image processing circuit 114 to the RAM 132 and a DMA (Direct Memory Access), a control program for performing DMA transfer of image data from the RAM 132 to the LCD control circuit 125, a control program for performing JPEG compression or MPEG compression of image data for storage in the flash memory 133 in a given final format, and a control program for commanding image pickup operation depending on an operation executed on the operating section 129.

The RAM 132 temporarily stores image data (image data in the format of YCbCr) output from the image processing circuit 114. Further, the RAM 132 is used as a temporary buffer that temporarily stores image data subjected to JPEG compression or MPEG compression and read out from the flash memory 133. Moreover, the RAM 132 is also used as a work memory for the CPU 124 to execute compression or expansion processing on image.

The flash memory 133 records image data subjected to JPEG compression or MPEG compression executed by the CPU 124. The LCD control circuit 125 controls the display driver circuit 127 in response to image data recorded in the VRAM 126.

The display driver circuit 127 supplies control signals to the LCD display device 128 under a control of the LCD control circuit 125 for driving the LCD display device 128. The LCD display device 128 is driven in response to a control signal supplied from the display driver circuit 127 for providing a display of image data recorded in the VRAM 126.

The operating section 129 is comprised of various operating buttons such as a shutter button and an image-recording button or the like. The LCD display device 128 functions as an electron viewfinder and has a display capacity with pixels of, for instance, 640×480.

The microphone 120 converts a surrounding voice into a voice signal. The A/D converter circuit 121 converts the voice signal supplied from the microphone 120 to digital voice data, which in turn is supplied to the CPU 124.

The rechargeable battery 122 supplies electric power to various parts of the camera 100. The rechargeable battery 122 is connected to a power connector 150 to be charged by electric power supplied from the cradle 200 via the power connector 150 when the camera 100 is attached to the cradle 200.

The DC/DC converter 123 converts an output voltage, corresponding to electric power output from the rechargeable battery 122, to a voltage needed for the CPU 124 and other relevant component parts for supply to the various component parts. The multiplexer 130 multiplexes image data, corresponding to the pickup image, and image data recorded in the flash memory 133 in a variety of combinations as described later.

The system bus 140 includes address lines, data lines and control lines for connection to the CPU 124, the multiplexer 130, the ROM 131, the RAM 132 and the flash memory 133.

Further, the system bus 140 is connected to a data connector 160 and arranged to be operative to transfer data to the cradle 200 via the data connector 160 when the camera 100 is attached to the cradle 200.

The cradle 200 has a function to charge the rechargeable battery 122 of the camera 100 and a function to buck up image data recorded in the flash memory 133.

Furthermore, the cradle 200 includes a USB connector (Universal Serial Bus) 201, a power supply circuit 202, a power detection circuit 203, a charging circuit 204, a power connector 250, a control circuit 210, a hard disk device (HDD) 220, a demultiplexer 230, a system bus 240 and a data connector 260.

When the camera 100 is attached to the cradle 200, the power connector 250 of the cradle 200 is connected to the power connector 150 of the camera 100. Also, the data connector 260 of the cradle 200 is connected to the data connector 160 of the camera 100.

Thus, the power detection circuit 203 of the cradle 200 and the rechargeable battery 122 of the camera 100 are connected to each other and, also, the charging circuit 204 of the cradle 200 and the rechargeable battery 122 of the camera 100 are connected to each other.

The power supply circuit 202 is started up by the power detection circuit 203 to supply electric power to various parts of the cradle 200. The charging circuit 204 charges the rechargeable battery 122 using electric power supplied from the power supply circuit 202.

The power detection circuit 203 detects whether or not the power connectors 150 and 250 are connected to each other depending on variation in a voltage of the power connector 250 and upon detection of the power connectors 150 and 250 being connected to each other, the power supply circuit 202 is started up.

The control circuit 210 is comprised of a CPU (not shown), a ROM and a RAM or the like for controlling the writing of image data to the HDD 220 and the reading of image data from the HDD 220.

For instance, the CPU 124 supplies image data to the RAM 132 via the system bus 140 on a serial time basis for compression and, subsequently, image data is supplied to the multiplexer 130 for multiplexing, after which the resulting image data is supplied through the system bus 140 and the data connector 160 to the demultiplexer 230 intervening the data connector 260 of the cradle 200 and the system bus 240.

Multiplexed image data supplied to the demultiplexer 230 is demultiplexed and demultiplexed image data is written to the HDD 220 under a control of the control circuit 210.

The control circuit 210 can appropriately read out image data, recorded in the HDD 220, for transmission to a computer or the like connected to the USB connector 201. Accordingly, by connecting the computer to the USB connector 201, a user can refer to image data recorded in the HDD 220.

Next, description is made of operations of the camera 100 and the cradle 200 of the present embodiment according to the present invention.

As the detachable flash memory 133 is mounted to a flash memory mount section (not shown) of the camera 100 to allow the flash memory 133 to be coupled to the system bus 140, the CPU 124 forms a DCF (Design rule for Camera Film system) correspondence folder structure for saving image data in the flash memory 133.

Upon operation of a user to depress the shutter button of the operating section 129, the CPU 124 executes JPEG compression on image data output from the image processing circuit 114 and, subsequently, adds adjunct data to compressed image data in a given format for storage as a JPEG file in a folder prepared in the flash memory 133.

Also, detaching the flash memory 133 from a body of the camera 100 and connecting the same to the computer through an existing card reader enables contents of all the files recorded in the flash memory 133 to be displayed over a monitor screen of the computer.

The LCD control circuit 125 converts image data (image data output from the image processing circuit 114 or image data readout from the flash memory 133 and subjected to JPEG expansion), supplied from the CPU 124 in the YCrCb format, to image data in the RGB format and allows image data (hereinafter referred to as "RGB image data") with the RGB format staying with converted image data to be written to the VRAM 126.

Subsequently, the LCD control circuit 125 reads out RGB image data, recorded in the VRAM 126, for supply to the display driver circuit 127. The display driver circuit 127 drives the LCD display device 128 in accordance with RGB image data supplied from the LCD control circuit 125. This allows RGB image data to be displayed over the LCD display device 128.

The shutter button of the operating section 129 includes a switch for commanding a start of image pickup operation for a still image and may be operative in two positions including a halfway-press mode and a full-press mode. The CPA 124 reads out an image pickup condition recorded in a given folder of the flash memory 133 before shooting and sets control parameters such as shutter speeds and aperture values or the like in values proximate to the relevant image pickup condition.

Further, if the shutter button is brought into the halfway-press mode, the CPU 124 locks the control parameters such as the shutter speeds and aperture values or the like and if the shutter button is brought into the full-press mode, allows image data, output from the image processing circuit 114, to be transferred to the RAM 132 in a phase of shooting with only the body of the camera 100. Image data is subjected to JPEG compression and saved in a given folder of the flash memory 133 under a given file name.

With the body of the camera 100 attached onto the cradle 200, the power connectors 150 and 250 are connected to each other and the data connectors 160 and 260 are also connected to each other.

The power detection circuit 203 detects a connection between the power connectors 250 and 150 depending on variation in voltage of the power connector 250 for supplying a given detection signal to the power supply circuit 202 upon detection of the connection between the power connectors 250 and 150.

Upon receipt of the detection signal from the power detection circuit 203, the power supply circuit 202 powers on the cradle 200 for supplying electric poser to various parts thereof. Upon receipt of electric power from the power supply circuit 202, the charging circuit 204 supplies electric power from the power connector 250 to the rechargeable battery 122 via the power connector 150 to begin the charging of the rechargeable battery 122. The charging circuit 204 monitors a charging voltage of the rechargeable battery 122 and terminates charging operation at a time instant when a specified voltage is established.

Further, upon receipt of electric power from the power supply circuit 202, the control circuit 210 of the cradle 200 transfers image data, recorded in the flash memory 133, to the HDD 220. Image data, recorded in the flash memory 133, is erased each time image data is transferred to the HDD 220.

Furthermore, if the shutter button of the operating section 129 is depressed with the camera 100 attached to the cradle 200 to command shooting an image, the camera module 110 executes the shooting of the image to allow the image processing circuit 114 to output pickup image data.

This image data is deployed in the RAM 132 for JPEG compression and, thereafter, the multiplexer 130 multiplexes this image data with image data, recorded in the flash memory 133, for transfer to the cradle 200 via the system bus 140 and the data connector 160.

During operation to multiplex these image data, the multiplexer 130 multiplexes image data, picked up on a real time basis, in priority to image data recorded in the flash memory 133. Multiplexed image data is serially transferred through the system buses 140 and 240 to the cradle 200. Transferred image data is erased from the slush memory 133 each time image data is transferred.

The demultiplexer 230 of the cradle 200 demultiplexes multiplexed image data transferred from the camera 100 via the system bus 240. The control circuit 210 allows demultiplexed image data to be recorded in the HDD 220.

When recording image data transferred from the camera 100 in the HDD 220, the HDD 220 can also record image data, picked up by the camera module 110 on a real time basis, in priority to image data already recorded in the flash memory 133. In this moment, the control circuit 210 shifts image data, already recorded in the flash memory 133, to the HDD 220 in a process such as background processing or the like not based on a real time operation (real-time processing).

Figure 2:
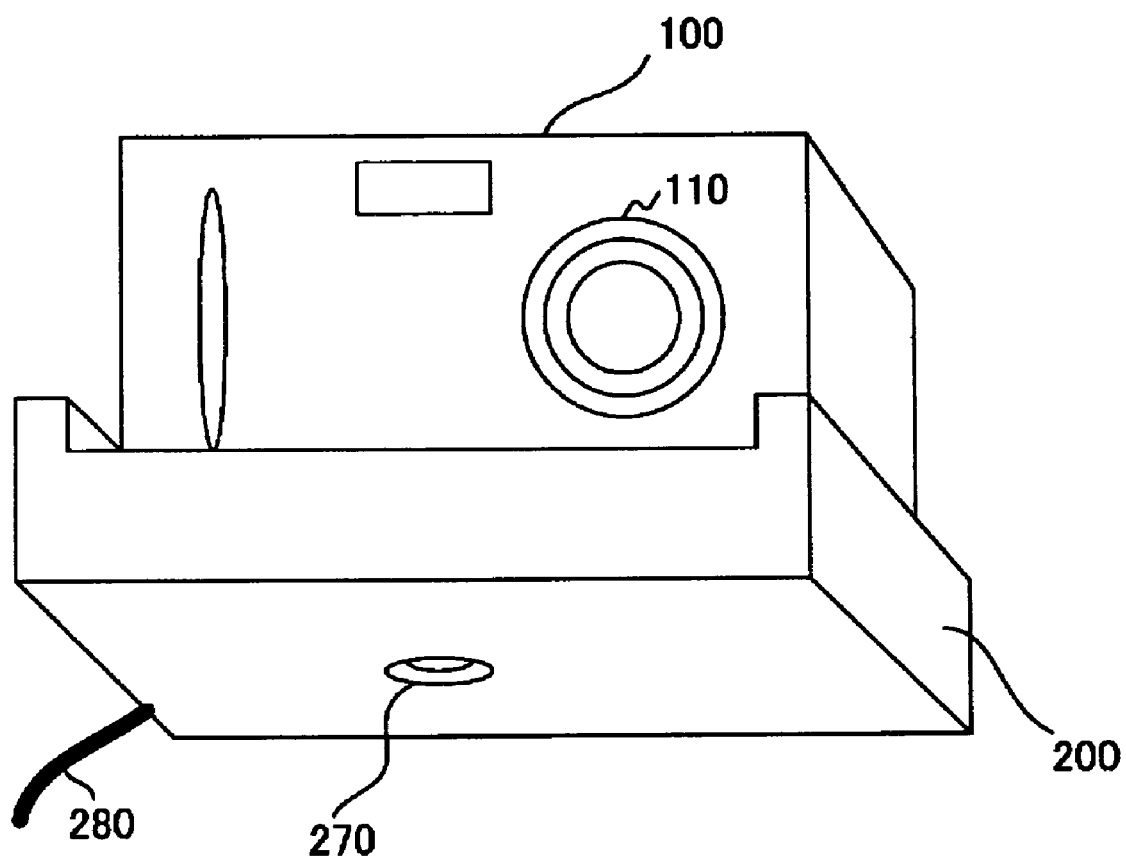
FIG. 2 is a perspective view showing a status with the camera 100 attached to the cradle 200 in the embodiment according to the present invention.

The cradle 200 has a tripod bore 270, as shown in FIG. 2, and fixing a screw of a tripod to the tripod bore 270 enables the tripod to be attached to the cradle 200. Accordingly, attaching the camera 100 onto the cradle 200 and fixing the cradle 200 onto the tripod enables a shooting direction to be fixed for achieving the serial shooting on still images with high capacity and shooting of moving images with high capacity.

Further, with the cameral 100 being detached from the cradle 200, the rechargeable battery 122 of the body of the camera 100 has a remaining battery level higher than that appearing before the camera 100 is attached to the cradle 200 and the flash memory 133 has an increased available memory for image data to be recorded with the resultant capability of carrying only the camera 100 per for shooting with a light heart.

Furthermore, although the camera 100 may be conceivably attached to the cradle 200 to continue the shooting in the presence of decreases in an available memory of the flash memory 133 and a remaining battery level of the rechargeable battery 122 during the shooting with only the camera 100 in hand, in such a situation, either one of the following control methods may be employed as scheme to continue the shooting without interruptions in moving images under shooting on a real time basis or still images under serial shooting.

A first method includes an aspect in which during the shooting with only the camera 100 in hand, the flash memory 133 is caused to record image data of serially shot images or moving images under given file names and if the flash memory 133 comes close to an overload state in capacity, the camera 100 is attached to the cradle 200 to allow image data of the still images and the moving images, currently shot by the camera 100, to be recorded in the HDD 220 of the cradle 200 under separate file names.

A first method includes an aspect in which during the shooting with only the camera 100 in hand, the flash memory 133 is caused to record image data under given file names whereas with the camera 100 being attached to the cradle 200, an overflow almost occurs in capacity of the flash memory 133 (in shortage of record capacity) and, concurrently, image data are caused to be recorded in the HDD 220 of the cradle 200 under the other file names as separate files after which upon completion of the shooting, two files are connected to each other to be formatted in a file name or the like.

A third method includes an aspect in which during the shooting with only the camera 100 in hand, the flash memory 133 is caused to record image data under given file names whereas the camera 100 is attached to the cradle 200 and, concurrently, image data appearing during the shooting are caused to be recorded in the HDD 220 of the cradle 200 under the other file names as separate files even in the course of the shooting.

A fourth method includes an aspect in which during the shooting with only the camera 100 in hand, the flash memory 133 is caused to record image data whereas the camera 100 is attached to the cradle 200 and, concurrently, image data appearing during the shooting are caused to be recorded in the HDD 220 of the cradle 200 under the other file names as separate files even in the course of the shooting after which upon completion of the shooting, these files are connected to each other to be formatted in file names or the like.

A fifth method includes an aspect in which during the shooting with only the camera 100 in hand, the flash memory 133 is caused to record image data whereas the camera 100 is attached to the cradle 200 and, concurrently, image data, already recorded in the flash memory 133, is shifted to the HDD 220 of the cradle 200 by little and little to allow image data to be recorded in an available memory created in the flash memory 133.

Further, on the contrary, the camera 100 may be conceivably detached from the cradle 200 during the shooting with the camera 100 attached to the cradle 200. Even under such a situation, either one of control methods described below can be taken as a scheme to continue the shooting without causing interruptions in moving images, shot on a real time basis, or still images under serial shooting.

A first method includes an aspect in which the HDD 220 is caused to record image data during the shooting with only the camera 100 in hand whereas image data appearing during the shooting are recorded in the flash memory 133 under other file names as separate files concurrently with the camera 100 being detached from the cradle 200.

A second method includes an aspect in which the HDD 220 is caused to record image data during the shooting with the camera 100 attached to the cradle 200 whereas image data appearing during the shooting are recorded in the flash memory 133 under other file names as separate files concurrently with the camera 100 being detached from the cradle 200 after which upon completion of the shooting, image data are shifted from the flash memory 133 to the HDD 220 and these files are connected to each other to be formatted in file names or the like.

Moreover, in view of a situation for the camera 100 attached to or detached from the cradle 200, the LCD display device 128 of the camera 100 can be arranged to display a remaining maximum shooting burst or a remaining shooting time interval resulting from calculation based on an available memory of the flash memory 133 and the number of pixels or the like of image data on a real time basis.

Likewise, a display device (not shown) of the cradle 200 may be arranged to display the remaining maximum shooting burst or the remaining shooting time interval or the like, resulting from calculation based on the available memory of the flash memory 133 and the number of pixels or the like of image data, on a real time basis. By so doing, the user can have an access to the remaining maximum shooting burst or the remaining shooting time interval with improved usability.

Here, an available remaining recordable memory (remaining memory) can be calculated by subtracting a spent record memory from an entire record memory of the flash memory 133 in a formula expressed as Remaining Memory=Entire Record Memory−Spent Record Memory Further, the number of remaining recordable images (remaining maximum shooting burst) can be calculated in a quotient, obtained by dividing the remaining memory by a record memory (record memory needed for recording image data) corresponding to the number of current pixels, in a formula expressed as Remaining Maximum Shooting Burst=Quotient of (Remaining Available Memory/Record Memory corresponding to Current Pixel Count)

FIG. 2 is a schematic perspective view showing a status with the camera 100 attached to the cradle 200. The cradle 200 includes a power cord (AC cord) 280, supplied with electric power from an outlet, and a tripod bore 270 through which the cradle 200 is fixed to a tripod.

Figure 3A:
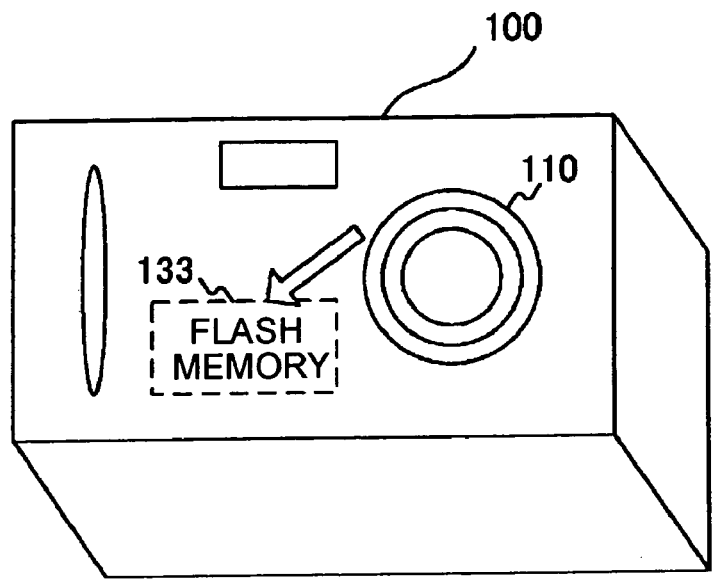
FIG. 3A is a typical view showing how image date is exchanged between the camera 100 and the cradle 200 of the embodiment according to the present invention.
Figure 3B:
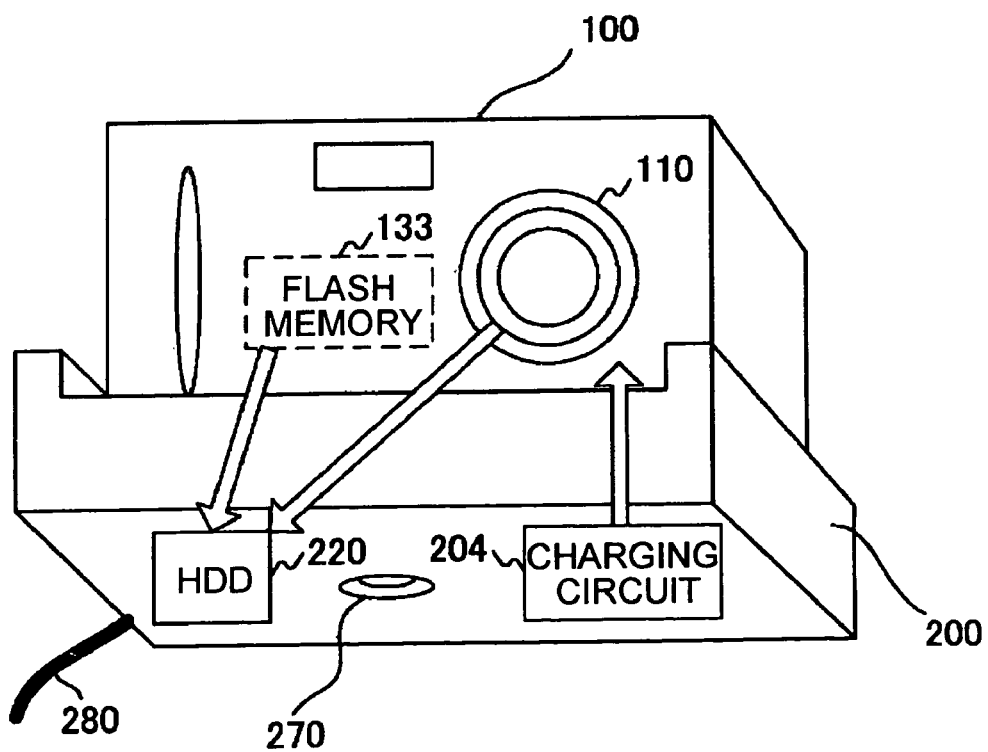
FIG. 3B is a typical view showing how image date is exchanged between the camera 100 and the cradle 200 of the embodiment according to the present invention.

FIGS. 3A and 3B are typical views showing the camera 100 and the cradle 200 under a phase in exchanging image data. FIG. 3A is the typical view showing a phase in exchange of image data during the shooting with a single piece of the camera 100 and illustrating a status wherein image data is picked up by the camera module 110 and recorded in the flash memory 133.

Moreover, FIG. 3B is the typical view showing a phase in exchange of image data during the shooting with the cameral 100 attached to the cradle 200 and shows a status where image data, picked up by the camera module 110, is recorded in the HDD 220 of the cradle 200 and image data, already recorded in the flash memory 133, is shifted to the HDD 220. Also, FIG. 3B shows a status where the rechargeable battery 122 of the camera 100 is charged with the charging circuit 204 of the cradle 200.

While with an example shown in FIG. 3B, the cradle 200 has the power cord 280 through which electric power is supplied, the cradle 200 may be arranged to incorporate a secondary battery with a high capacity to allow the secondary battery to charge the rechargeable battery 122 of the camera 100 at a repeated frequency.

Figure 4:
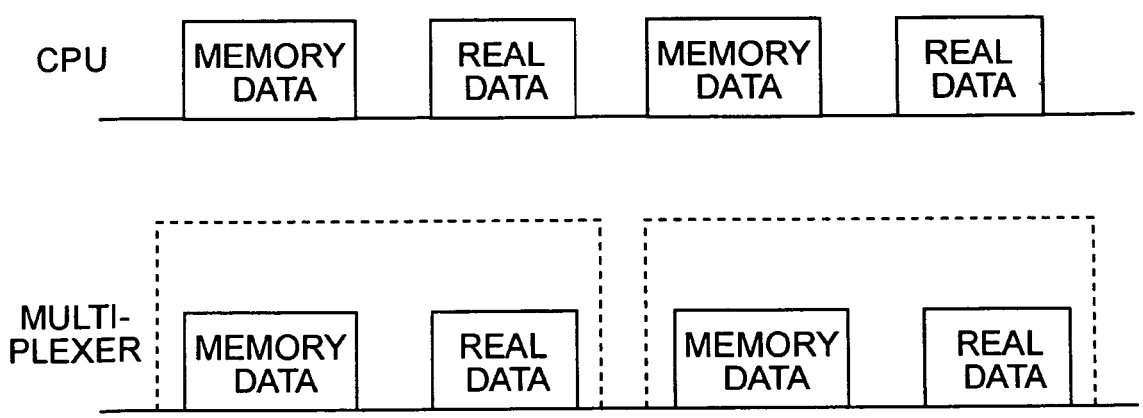
FIG. 4 shows how a multiplexer 130 of the camera 100 of the present embodiment according to the present invention multiplexes image data.

FIG. 4 shows a phase in which the multiplexer 130 multiplexes image data. Image data, transferred from the camera 100 to the cradle 200, includes data (hereinafter referred to as "real data"), picked up by the camera module 110 on a real time basis, and data (hereinafter referred to as "memory data") that is already recorded in the flash memory 133.

Real data, transferred from the CPU 124 to the RAM 132 via the system bus 140, and memory data delivered from the flash memory 133 to the system bus 140 via the flash memory 133 are not multiplexed at that point in time and the multiplexing of the same is executed by the multiplexer 130.

The multiplexer 130 includes a phase of multiplexing memory data and real data and another phase of multiplexing memory data per se or real data per se. Multiplexed image data are supplied to the demultiplexer 230 via the system bus 140, the data connector 160, the data connector 260 of the cradle 200 and the system bus 240 for demultiplexing operation.

Also, the operations of the multiplexer 130 and the demultiplexer 230 set forth herein are executed for realizing data transfer under no control of the CPU 124 and the control circuit 210. This provides an advantageous effect of minimizing loads on the CPU 124 and the control circuit 210. As a consequence, if the CPU 124 and the control circuit 210 have margins in processing capacity, the CPU 124 and the control circuit 210 may be arranged to execute data transfer control with no provision of the multiplexer 130 and the demultiplexer 230.

Figure 5:
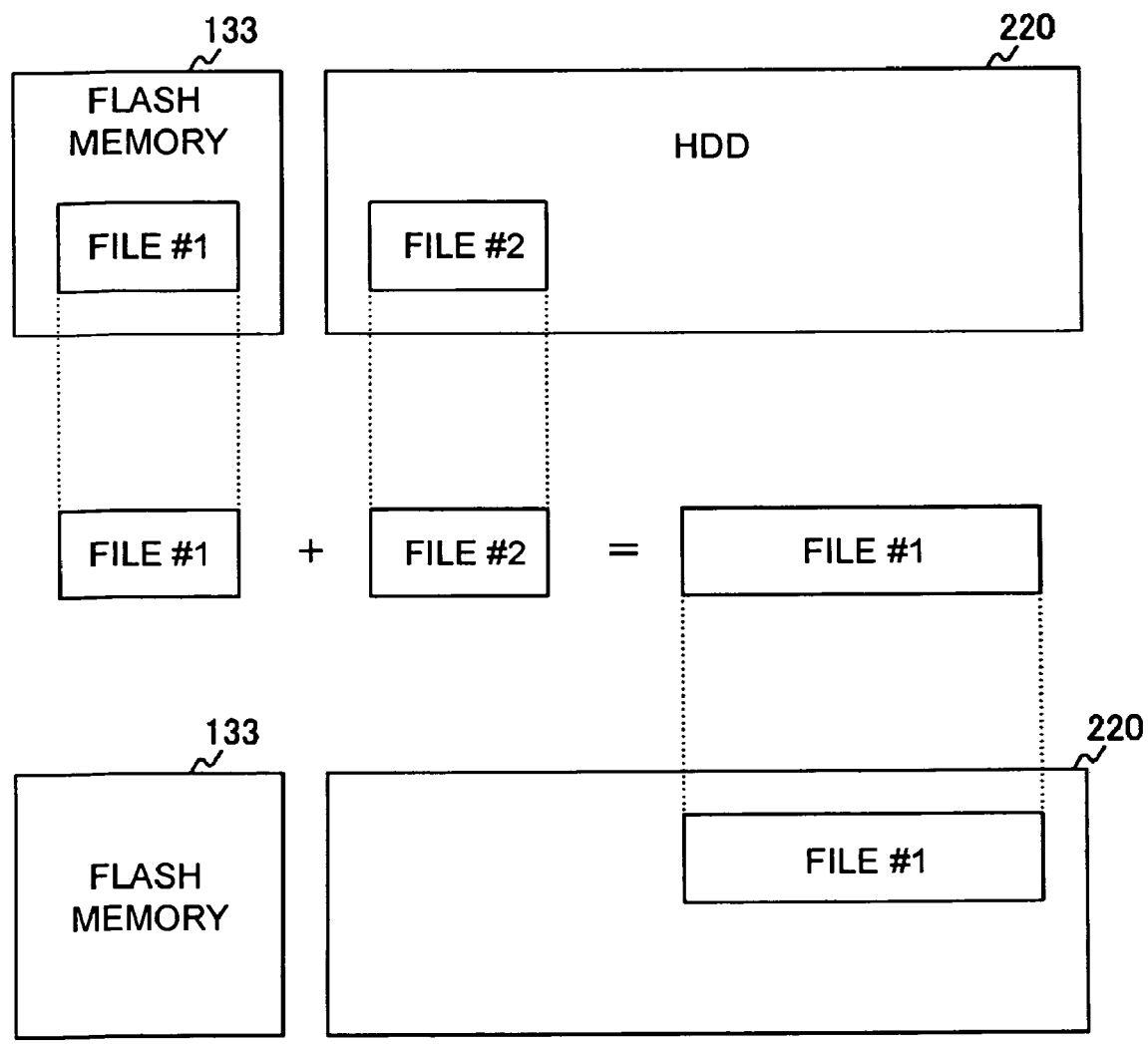
FIG. 5 is a view showing a method of consolidating a file #1, recorded in a flush memory 133 of the camera 100, and a file #2 recorded in a HDD 220 of the cradle 200 in the embodiment according to the present invention.

FIG. 5 shows an aspect wherein a file #1, recorded in the flash memory 133, and a file #2, recorded in the HDD 220 of the cradle 200, are consolidated in the file #1 and recorded in the HDD 220.

For instance, if the shooting is performed with a single piece of the camera 100 and the camera 100 is then attached to the cradle 200 during a phase in which image data, corresponding to moving images, is recorded in the flash memory 133 as the file #1, image data, corresponding to moving images shot on a subsequent stage, is recorded in the HDD 220 as the file #2.

Further, the file #1 recorded in the flash memory 133 is transferred to the HDD 220 concurrently with the camera 100 being attached to the cradle 200 and the file #1 is erased from the flash memory 133.

With the shooting with the camera 100 being completed, the HDD 220 comes to a status wherein image data, corresponding to a series of moving images resulting from a start of shooting to an end thereof, is recorded in separate forms in the file #1 and the file #2.

Therefore, the control circuit 210 consolidates the file #1 and the file #2, recorded in the HDD 220, into a new file #1 that in turn is overwritten in the HDD 220.

In order to represent that a file includes continuous image data formed of the file #1 and the file #2, for instance, continuous numbers can be allocated to the file #1 and file #2 or a file name of the file #1 can be included in a file name of the file #2. By doing, easy judgment can be made to find which of the files are to be consolidated. Or, files per se to be consolidated may be correlated to each other in other ways.

For instance, the remaining file name resulting from the files being consolidated is fed back to the camera 100. This results in consequence with subsequently shot image data being assigned with a feedback file name and recorded in the flash memory 133.

Figure 6A:
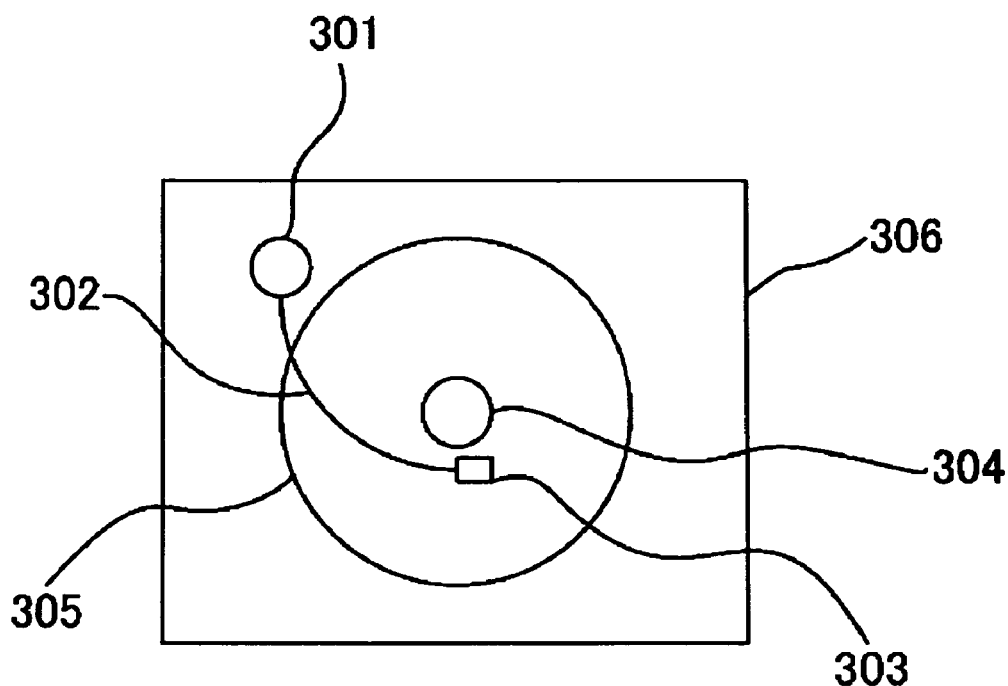
FIG. 6A is a typical view showing an internal structure of the HDD 220 of the cradle 200 in the embodiment according to the present invention.
Figure 6B:
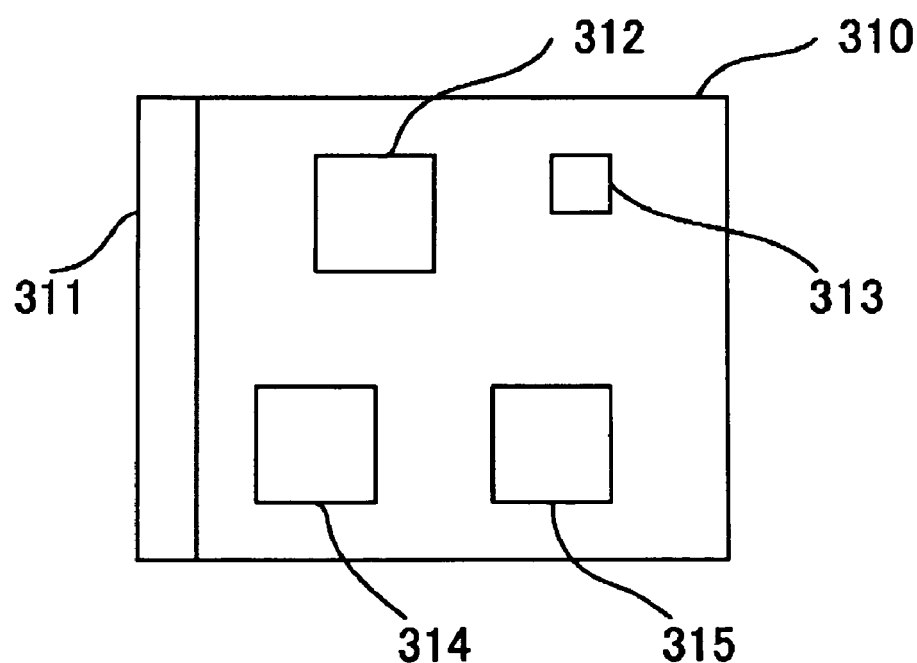
FIG. 6B is a typical view showing an internal structure of the HDD 220 of the cradle 200 in the embodiment according to the present invention.

FIGS. 6A and 6B are typical views showing internal structures of the HDD 220. As shown in FIG. 6A, the HDD 220 is comprised of an actuator 301, an arm 302, a head 303, a spindle 304, a platter 305, a housing 306 of the HDD 220.

The platter 305 has front and rear surfaces coated with magnetic material such that data is recorded on the front and rear surfaces of the platter 305. The head 303 is mounted to a distal end of the arm 302 and arranged to slide over the surface of the platter 305 in non-contact therewith during movement of the arm 302 caused by the actuator 301 that is described below.

The head 303 serves to read or write an orientation of magnetic material magnetized on the surface of the platter 305. The actuator 301 is arranged to drive the arm 302 and the head 303 at high precision in a way to align the head 303 with tracks concentrically lined on the surface of the platter 305. The spindle 304 rotatably supports the platter 305 and is driven by a motor (VCM (Voice Coil Motor)) 317 (see FIG. 7) to rotate at a given speed.

As shown in FIG. 6B, further, a control section for controlling the HDD 220 is comprised of a print circuit board 310, a terminal portion 311, a motor driver 312, a read/write channel circuit 313, a hard disk controller 314 and a microcomputer 315.

The read/write channel circuit 313 serves to output write data upon modulation thereof in code and detect data from readout data for demodulation in code. The data driver 312 drives the VCM 317 by which the platter 305 is rotated.

The microcontroller 315 executes an overall control such as, for instance, a control for positioning the head 303. The hard disk controller 314 includes an error correction circuit, a buffer control circuit and a servo circuit or the like.

Figure 7:
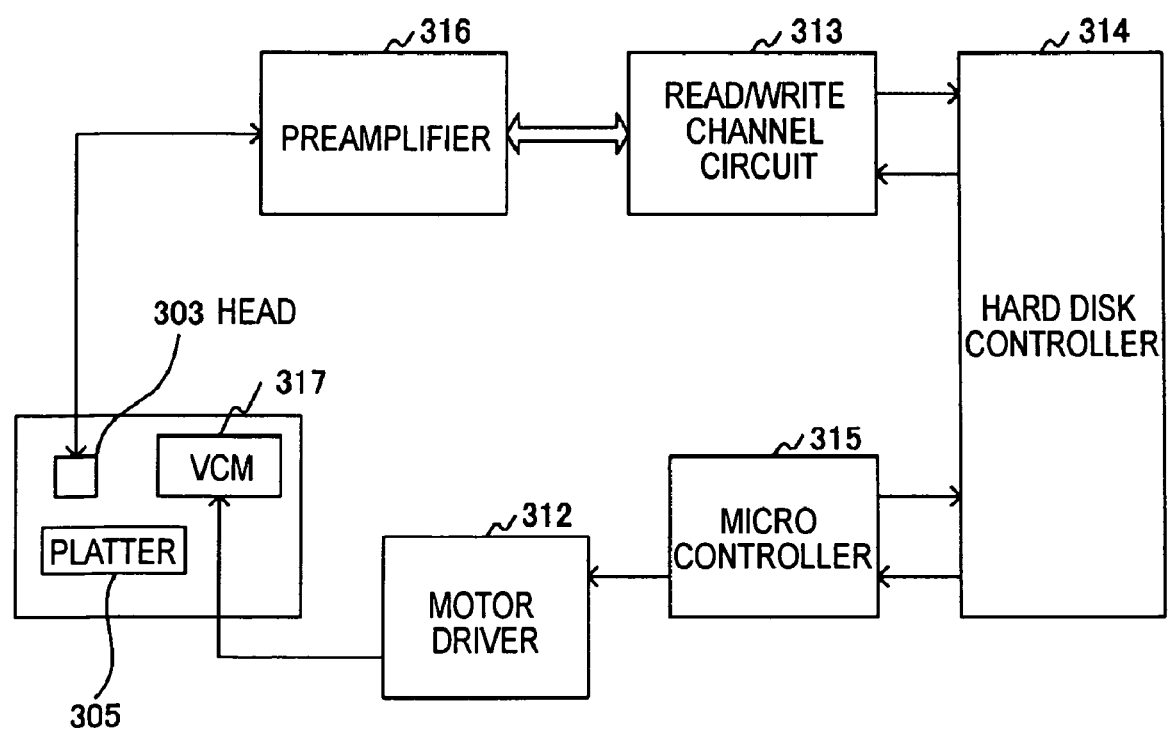
FIG. 7 is a view showing a further detailed structural example of the HDD 220 of the cradle 200 of the embodiment according to the present invention.

FIG. 7 is a view showing a further detailed structural example of the HDD 220. A preamplifier 316 amplifies an electric signal read out by the head 303 and supplies an amplified electric signal to a read/write channel circuit 313. Further, the preamplifier 316 amplifies the electric signal supplied from the read/write channel circuit 313 for supply to the head 303.

The read/write channel circuit 313 modifies data, to be written to the platter 303 supplied from the hard disk controller 314, in code for supply to the preamplifier 316 and detects data from an output signal delivered from the preamplifier to demodulate the same in code for supply to the hard disk controller 314.

The hard disk controller 314 includes an error correction circuit, a buffer control circuit and a servo circuit, performing error correction processing, buffer control processing and servo control or the like. A microcomputer 315 performs overall control. A motor driver 312 controls a VCM (Voice Control Motor) 317 for rotation at a given speed. The VCM 317 drivably rotates the platter 305 via a spindle 304 at a given speed.

As the platter 305 of the HDD 220 is drivably rotated, a noise sound is generated and has a probably for a voice and the noise sound to be fetched by the microphone 120 and recorded in the HDD 220 or the flash memory 133. The noise sound of the HDD 220 includes two kinds. Description is simply made of a principle in which the HDD 220 generates the noise sound.

As set forth above, the HDD 220 incorporates therein a metallic circular disk that is referred to as the platter 305 and the arm 302, extending from a lower portion of a central area of the platter 305, has a distal end carrying the head 303. The arm 302 is driven by the actuator 301 and moves in an area over the platter 305 with an extremely slight amount of clearance being kept with respect to a surface of the platter 305.

The head 303 serves to write data to and read data from a Baumkuchen-like plat on the surface of the platter 305. During reading and writing of data, the platter 305 rotates at high speeds of 3,600 to 10,000 rpm and, concurrently, the arm 302 moves to given positions for data to be written or read out.

Therefore, a rotation sound (a high-frequency sound called as a whining sound) is generated due to friction encountered by the spindle 304 at the center area of the platter 305 and a seek sound (scratchy sound) due to friction around the VCM 317 during movements of the arm 302.

The noise sound increases with an increase in the rotational speed and, in order to suppress the noise sound to be silent, the rotational speed of the platter 305 is caused to drop during a period in which voice data from the microphone 120 is recorded. That is, during a period in which voice data taken by the microphone 120 of the camera 100 is recorded, the rotational speed of the platter 305 is caused to decrease to a lower level than that attained in normal operation for reduction of the noise sound resulting from the HDD 220.

For instance, in normal operation, when rotating the platter 305 at a rotational speed of 7200 rpm (Revolution Per Minute) and reading and writing data, the rotational speed of the platter 305 is caused to drop to a level of, for instance, 3600 rpm or the like for reduction of the noise sound resulting from the HDD 220 in order to avoid the noise sound of the HDD 220 from being fetched into the microphone 120 to be recorded during a period in which the voice fetched by the microphone 120 of the camera 100 is recorded.

Figure 8:
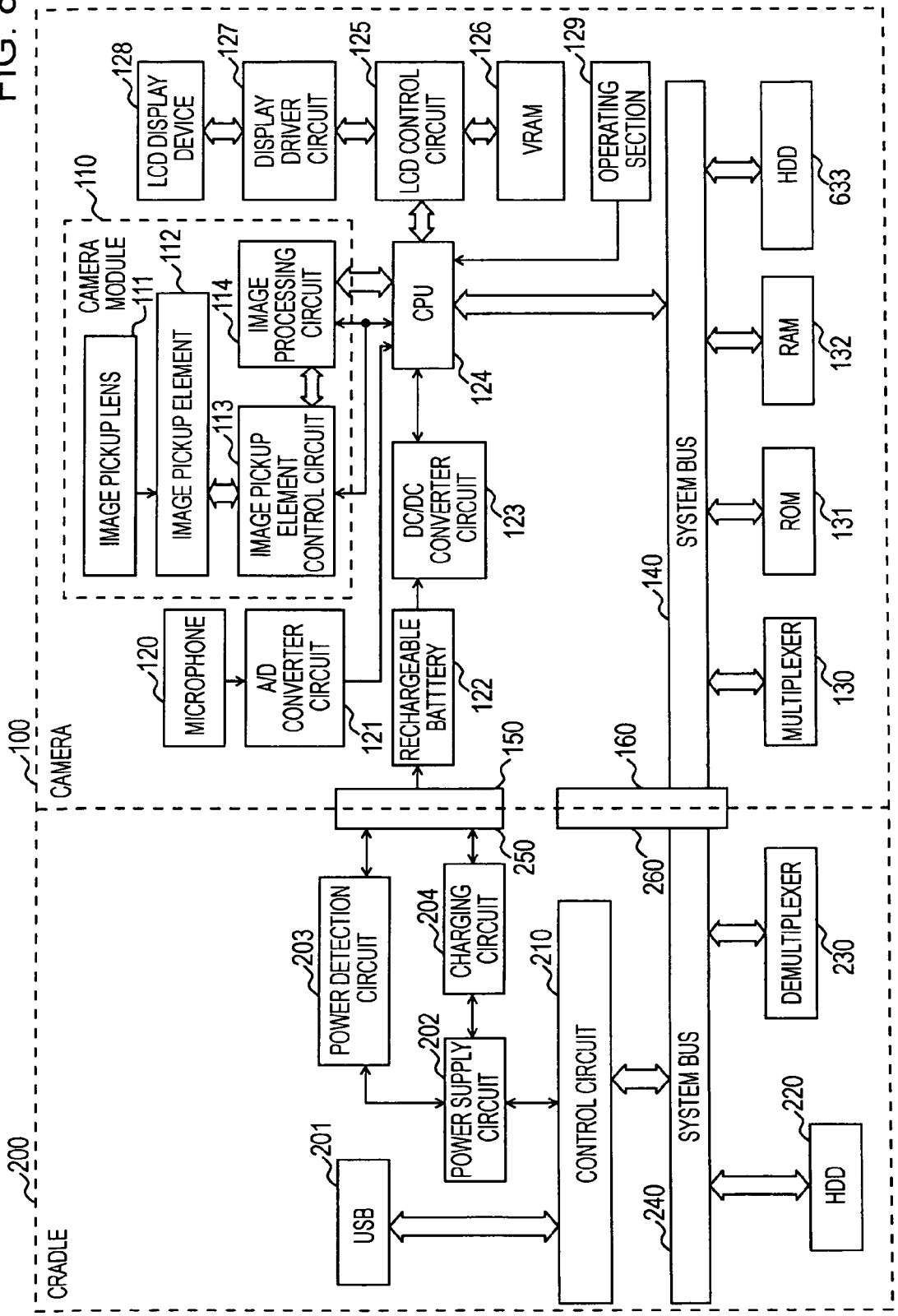
FIG. 8 is a block diagram showing other structural examples of the camera 100 and the cradle 200 of the embodiment according to the present invention.

As shown in FIG. 8, further, the flash memory 133 of the camera 100, shown in FIG. 1, may be replaced by a hard disk (HDD) 633. In such a case, the HDD 220 of the cradle 200 and the HDD 633 of the camera 100 are normally driven at a rotational speed of 7200 rpm for executing the writing of data at a high speed.

However, when the HDD 633 is recording a voice fetched by the microphone 120 of the camera 100, a rotational speed of the HDD 633 of the camera 100 is caused to drop to a level below, for instance, 3600 rpm, during operation in which the camera 100 is recording the voice, and image data is written while protecting the noise sound resulting from the HDD 633 from being recorded.

Under a situation where the shooting is performed with the camera 100 attached to the cradle 200 and image data, already recorded in the HDD 633, is transferred to the cradle 200, setting the rotational speed of the HDD 633 to a level below, for instance, 3600 rpm suppresses a noise sound resulting from the HDD 633 from being recorded.

In the meanwhile, in an event that detection is made that the camera 100 is recording a voice with the camera 100 attached to the cradle 200, setting the rotational speed of the HDD 220 to a level below, for instance, 3600 rpm minimizes a noise sound resulting from the HDD 220.

With the camera 100 attached to the cradle 200, the cradle 200 can detect whether or not the camera 100 is recording a voice depending on a preset value of the voice input setting section 521 set to the RAM 132 or the like.

Figure 9:
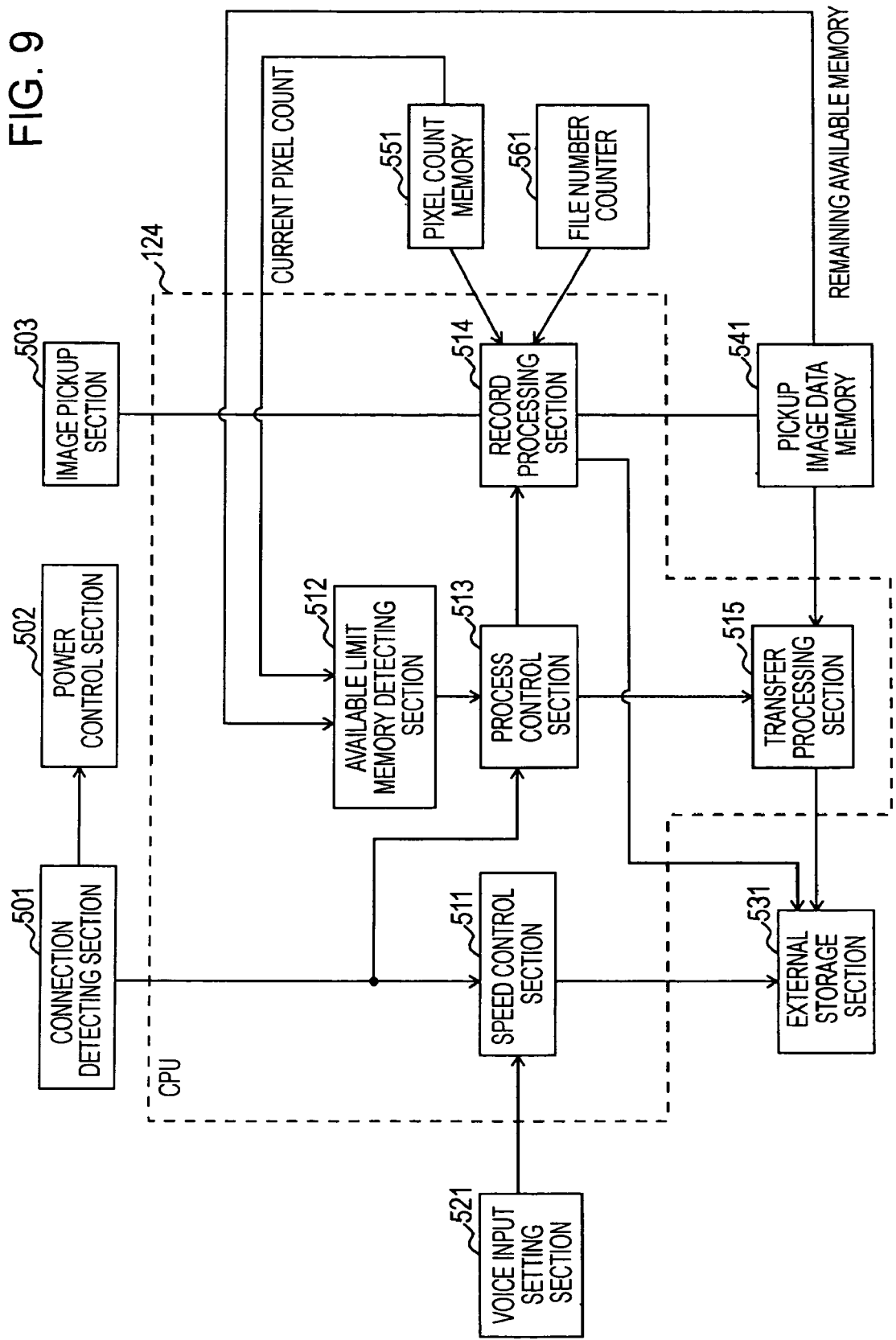
FIG. 9 is a block diagram showing functional and structural examples of the camera 100 and the cradle 200 of the embodiment according to the present invention.

FIG. 9 is a block diagram showing a functioning structural example of the camera 100 and the cradle 200 of the embodiment according to the present invention.

The camera 100 and the cradle 200 include a connection detecting section 501, a power control section 502, an image pickup section 503, a speed control section 511, an available limit memory detector section 512, a process control section 513, a record processing section 514, a transfer processing section 515, a voice input setting section 521, an external storage section 531, a pickup image data memory 541, a pixel count memory 551 and a file number counter 561.

The connection detecting section 501 is associated with the power detection circuit 203 and detects the presence or absence of a connection between the camera 100 and the cradle 200. The power control section 502 is associated with the power supply circuit 202 and begins to supply electric power to the cradle 200 upon detection of the connection detecting section 501.

The image pickup section 503 is associated with the camera module 110 and picks up still images or moving images on a given subject to supply image data, corresponding to the still images or moving images, to the record processing section 514.

The record processing section 514 is associated with the control program executed by the CPU 124 or the control circuit 210 and records image data from the image pickup section 503 in the pickup image data memory 541. In this moment, the record processing section 514 records image data as a file under a file name prepared based on a file number indicated by the file number counter 561 corresponding to count data recorded in the RAM 132.

When this takes place, a pixel count of recorded image data is converted to a pixel count that is preset to the pixel count memory 551 associated with the RAM 132.

The available limit memory detector section 512 is associated with the control program to be executed by the control circuit 210 and detects whether or not current pickup image data can be recorded depending on a record capacity corresponding to the pixel count preset to the pixel count memory 551 or a remaining available memory of the pickup image data memory 541.

The process control section 513 is associated with the control program to be executed by the CPU 124 or the control circuit 210 and controls the record processing section 514 and the transfer processing section 515 in response to a detection result from the available limit memory detector section 512.

The voice input setting section 521 serves to perform the setting of the presence of or absence of a voice input and can be realized as a setting button for image pickup modes representing whether image data includes a moving image or a still image. Further, the voice input setting section 521 may be realized as a switch for selecting an on-off state of the microphone 120 used for inputting a voice.

The speed controller 511 is associated with the control program to be executed by the CPU 124 or the control circuit 210 and regulates the rotational speed of the rotational drive sections (corresponding to the VCM 317) of the external storage section 531 (corresponding to the HDD 220) depending on whether or not the connection detecting section 501 detects the connection between the camera 100 and the cradle 200 or whether or not the voice input setting section 521 is preset to allow the inputting of a voice.

More particularly, upon detection of the connection between the camera 100 and the cradle 200, the rotational speed of the rotational drive sections of the external storage section 531 is caused to drop. In the absence of detection of the connection, the rotational speed is raised to a normal speed.

Figure 10:
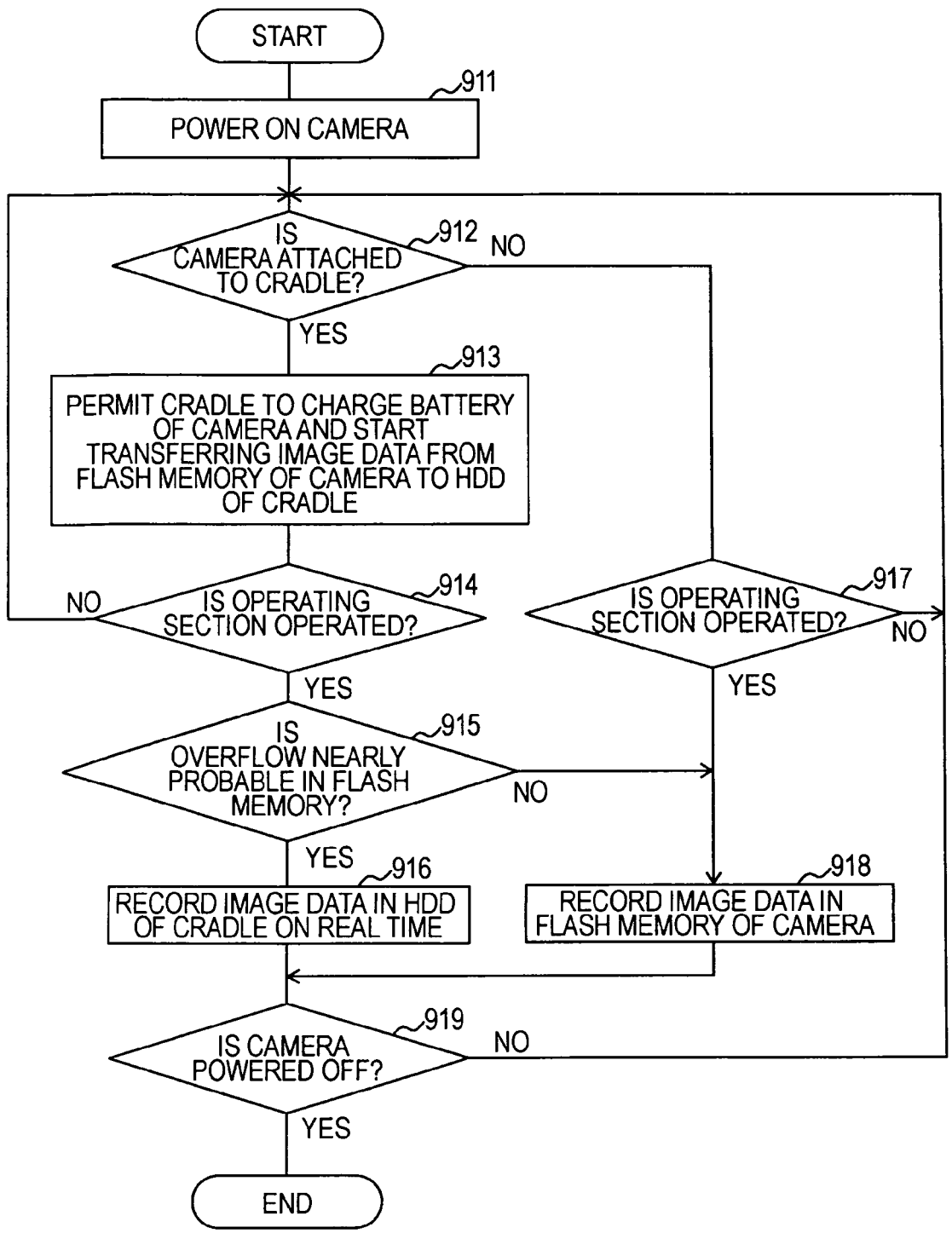
FIG. 10 is a flowchart representing an operational step of saving data, such as still images or moving images picked up by the camera 100, in the HDD 220 o the cradle 200 with the camera 100 and the cradle 200 of the embodiment according to the present invention.

Next, a step of operations of the camera 100 and the cradle 200 is described with reference to flowcharts shown in FIGS. 10 to 12. The flowchart shown in FIG. 10 represents an operating sequence in a case where data, involving still images or moving images picked up by the camera 100, are recorded in the HDD 220 of the cradle 200.

In step S911, first, if a user operates a power switch (not shown) of the camera 100 to power on the same, electric power is supplied to various parts of the camera 100 starting up the camera 100. In step S912, the power detection circuit 203 of the cradle 200 makes judgment depending on a voltage level of the power connector 250 to find whether or not the camera 100 is attached to the cradle 200.

As a result, if judgment is made that the camera 100 is attached to the cradle 200, then, the operation proceeds to step S913. On the contrary, if judgment is made that the camera 100 is not attached to the cradle 200, then, the operation goes to step S917.

In step S913, the power supply circuit 202 is supplied with information of power-on from the power detection circuit 203 and supplies electric power to the various parts of the cradle 200. Particularly, the charging circuit 204 is supplied with electric power needed for electric power to be charged. The charging circuit 204 supplies electric power to the rechargeable battery 122 of the camera 100 for the charging thereof using electric power supplied from the power supply circuit 202.

Further, upon detection of the beginning of the charging to the rechargeable battery 122 depending on a voltage level or the like of the rechargeable battery 122, the CPU 124 allows image data, recorded in the flash memory 133, to be transferred via the system bus 140, the date connectors 160, 260 and the system bus 240 to the HDD 220 of the cradle 200.

In this moment, image data maybe multiplexed by the multiplexer 130 for transfer to the cradle 200. In this case, the demultiplexer 230 of the cradle 200 demultiplexes multiplexed image data and the resulting demultiplexed image data is transferred to the HDD 220 under control of the control circuit 210 for record therein.

Next, in step S914, the operating section 129 is operated and judgment is made whether or not a command for image pickup is made. As a result, if judgment is made that no command for image pickup is made, the operation is returned to step S912 for repeated executions of rest operations subsequent to step S912.

In contrast, if judgment is made that the command for image pickup is made, the operation goes to step S915 wherein the camera 100 picks up an image with image data corresponding to the pickup image being transferred to the CPU 124. Image data, supplied to the CPU 124, is supplied to the RAM 132 once and compressed in JPEG or MPEG. Then, judgment is made whether or not overflow is probable to take place in the flash memory 133.

That is, judgment is made whether or not the flash memory 133 has no available memory needed for recording image data compressed by the RAM 132 and the flash memory 133 remains under a status with incapability of recording image data.

As a consequence, if judgment is made that the flash memory 133 has no adequate available memory with a difficulty in recording image data in the flash memory 133, the operation proceeds to step S916 wherein the CPU 124 transfers image data, recorded in the RAM 132, to the cradle 200 to which image data, resulting from current shooting, is transferred on a real time basis and recorded in the HDD 220.

In step S912, if judgment is made that the camera 100 is not attached to the cradle 200, the operation goes to step S917 where the CPU 124 executes judgment whether or not the operating section 129 is operated.

As a result, if judgment is made that no operating section 129 is operated, the operation is returned to step S912, for repeated executions of rest operations subsequent to step S912. In contrast, if judgment is made that the operating section 129 is operated, then, the operation goes to step S918.

Further, in step S915, if judgment is made that no probability of overflow takes place in the flash memory 133 (in the presence of an available memory needed for recording pickup image data), the operation goes to step S918. In step S918, the CPU 124 executes control so as to allow compressed image data, recorded in the RAM 132, to be supplied to and recorded in the flash memory 133.

Upon completion of the operations in step S916 or step S918, the operation proceeds to step S919 in which the CPU 124 executes judgment whether or not the camera 100 is powered off. As a result, if judgment is made that the camera 100 is not powered off, then, the operation goes to step S912 for repeated executions of rest operations subsequent to step S912.

On the contrary, if judgment is made in step S912 that the camera 100 is powered off, then, the current operation is terminated.

Figure 11:
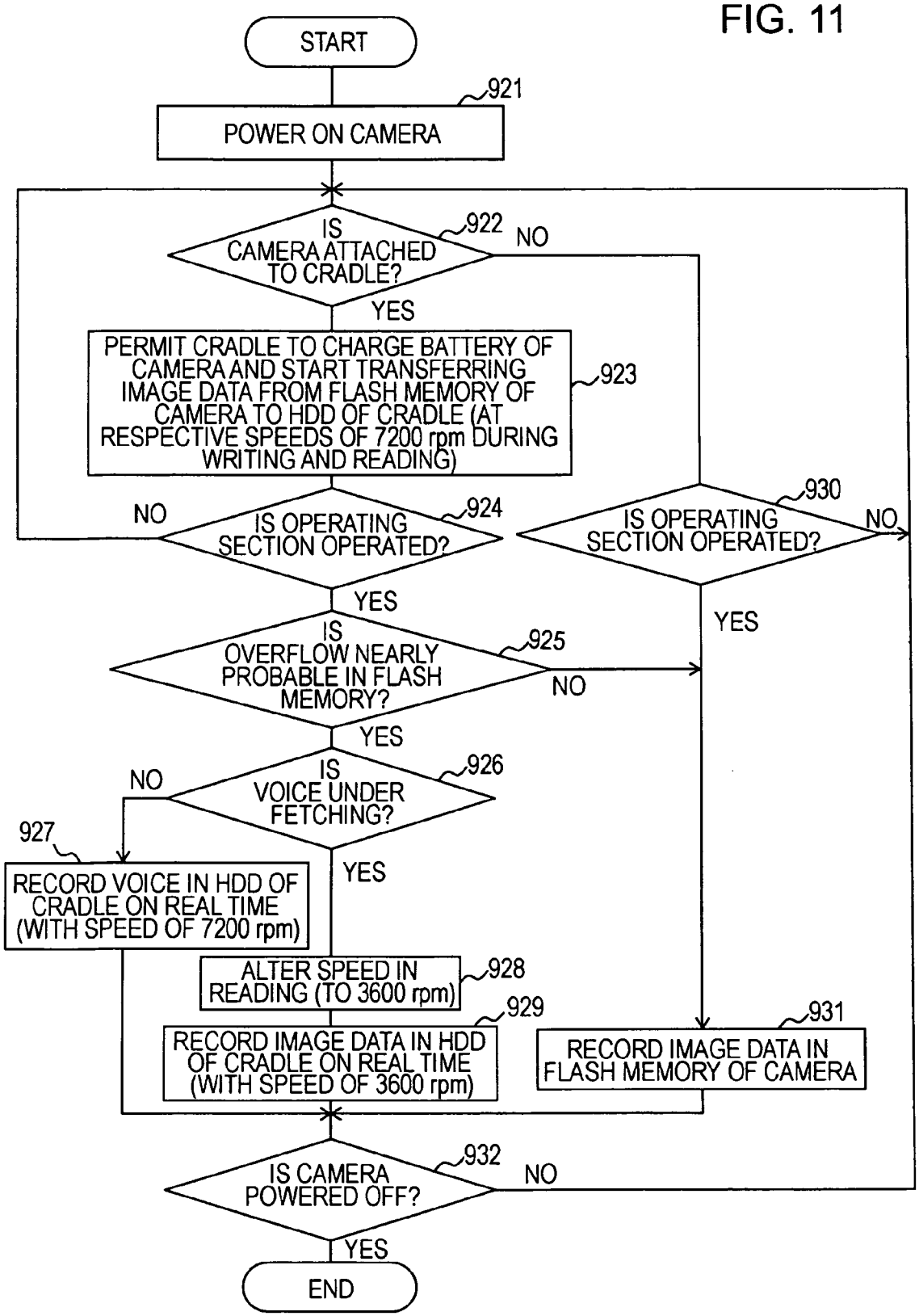
FIG. 11 is a flowchart representing a step of controlling a rotational speed of the HDD 220 depending on whether or not a voice is under recording with the camera 100 and the cradle 200 of the embodiment according to the present invention.

Next, reference is made to FIG. 11 and description is made of other operating sequences of the camera 100 and the cradle 200. The flowchart, shown in FIG. 11, includes, in addition to the flowchart shown in FIG. 10, a step of controlling the rotational speed of the HDD 220 depending whether or not a voice is being under recording.

First, in step S921, if a user operates the power switch of the camera 100 that is turn is powered on, then, electric power is supplied to the various parts of the camera 100 starting up the camera 100. In step S922, the power detection circuit 203 of the cradle 200 makes judgment depending on a voltage value of the power connector 250 whether or not the camera 100 is attached to the cradle 200.

As a result, if judgment is made that the camera 100 is attached to the cradle 200, then, the operation goes to step S923. On the contrary, if judgment is made that the camera 100 is not attached to the cradle 200, then, the operation proceeds to step S930.

In step S923, the power supply circuit 202 is notified with information on the presence of power-on from the power detection circuit 203 and supplies electric power to the various parts of the cradle 200. Especially, the charging circuit 204 is supplied with adequate electric power needed for the charging. The charging circuit 204 supplies electric power to the rechargeable battery 122 of the camera 100 for the charging thereof using electric power supplied from the power supply circuit 202.

Further, upon detection of the beginning of charging the rechargeable battery 122 depending on a voltage level or the like of the rechargeable battery 122, the CPU 124 allows image data, recorded in the flash memory 133, to be transferred to the HDD 220 of the cradle 200 via the data connectors 160, 260 and the system bus 240 intervening the system bus 140.

When this takes place, image data, multiplexed by the multiplexer 130, can be also transferred to the cradle 200. In such a case, the demultiplexer 230 of the cradle 200 demultiplexes multiplexed image data and the resulting demultiplexed image data is transferred to and recorded in the HDD 220 under control of the control circuit 210.

Moreover, the rotational speed of the platter 305 of the HDD 220 is set to a level of, for instance, 7200 rpm during operations in recording image data to or reading the same from the HDD 220.

Then, in step S924, judgment is made whether or not the operating section 129 is operated for commanding the image pickup. As a result, if judgment is made that no image pickup is commanded, then, the operation is returned to step S922 for repeated executions of rest operations subsequent to step S922.

On the contrary, if judgment is made that the image pickup is commanded, then, the operation goes to step S925, wherein the camera 100 picks up an image and image data, corresponding to pickup image, is supplied to the CPU 124. Image data, supplied to the CPU 124, is supplied to the RAM 132 once for compression in JPEG or MPEG. Subsequently, judgment is made whether or not a probability of overflow occurs in the flash memory 133.

That is, judgment is made whether or not the flash memory 133 remains in a status with no available memory for recording image data, compressed by the RAM 132, and no capability for recording image data.

As a result, if judgment is made that the flash memory 133 has no adequate available memory with incapability of recording image data in the flash memory 133, the operation goes to step S926. In step S926, judgment is made whether or not the camera 100 is recording a voice being fetched by the microphone 120.

This judgment can be set using the voice input setting section 521 and judgment can be made based on preset information recorded in the RAM 132. For instance, in a case where the RAM 132 is recorded with preset information representing that the operation is set to an operation mode for picking up a moving image with a voice, the CPU 124 judges that a fetched voice is being recorded.

As a result of this judgment, if judgment is made that the camera 100 is not recording the voice fetched by the microphone 120, the operation goes to step 927 in which the resulting image data is supplied to and recorded in the HDD 220 on a real time basis. In this moment, the platter 305 of the HDD 220 is rotatably driven at a speed of, for instance, 7200 rpm.

In contrast, if judgment is made that the camera 100 is recording the voice being fetched by the microphone 120, the operation goes to step 928 in which the control circuit 210 alters the rotational speed of the platter 305 to a speed of, for instance, 3600 rpm.

Subsequently, in step S929, the CPU 124 transfers image data, recorded in the RAM 132, to the cradle 200 and image data, resulting from the shooting, is recorded in the HDD 220 of the cradle 200 on a real time basis. In this moment, the rotational speed of the platter 305 of the HDD 220 is set to a speed of 3600 rpm for suppressing the occurrence of noise.

In step S922, if judgment is made that no camera 100 is attached to the cradle 200, the operation goes to step S930 in which the CPU 124 makes judgment whether or not the operating section 129 is operated.

As a result, if judgment is made that no operating section 129 is operated, then, the operation proceeds to step S922 for repeated executions of rest operations subsequent to step S922. On the contrary, if judgment is made that the operating section 129 is operated, then, the operation proceeds to step S931.

Further, in step S925, if judgment is made that no probability of overflow occurs in the flash memory 133 (in the presence of an available memory necessary for recording pickup image data), then, the operation goes to step S931 and, in step S931, the CPU 124 executes control so as to allow compressed image data, recorded in the RAM 132, to be supplied to and recorded in the flash memory 133.

Upon completion of the operations in step S927, step S929 or step S931, the operation goes to step S932 in which the CPU 124 makes judgment whether or not the camera 100 is powered off. As a result, if judgment is made that the camera 100 is not powered off, the operation is returned to step S922 for repeated executions of rest operations subsequent to step S922.

On the contrary, if judgment is made in step S932 that the camera 100 is powered off, then, the current operation is terminated.

Figure 12:
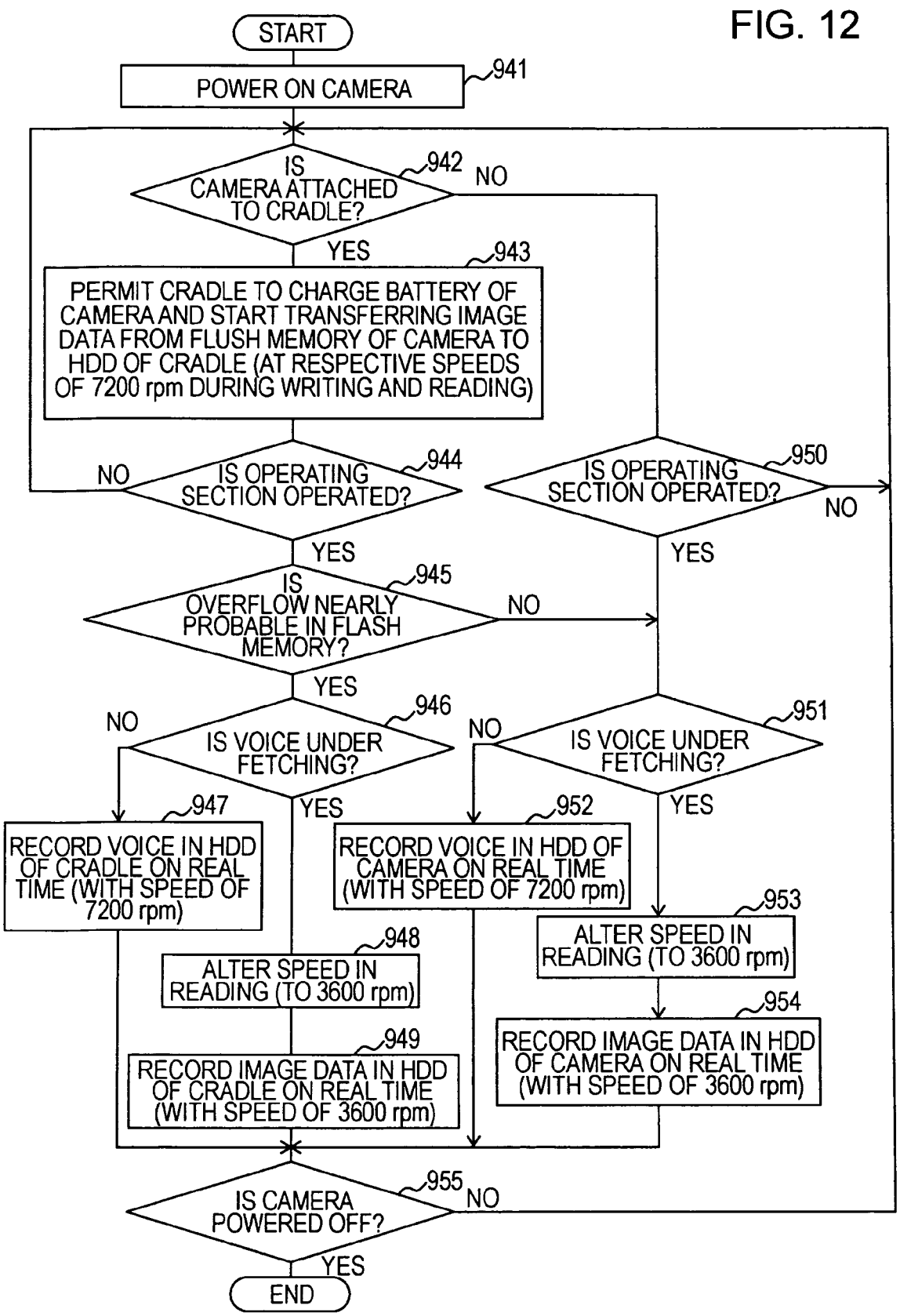
FIG. 12 is a flowchart representing operational sequences of the camera 100 and the cradle 200 under a situation where the flash memory 133 is replaced by a hard disk with the camera 100 and the cradle 200 of the embodiment according to the present invention.

Next, reference is made to a flowchart of FIG. 12 and description is made of a step of operations of the camera 100 and the cradle 200 in a case where the structure of FIG. 1 is modified with the flash memory 133 replaced by the hard disk 633 as shown in FIG. 8.

First, in step S941, if the user operates the power switch of the camera 100 that in turn is powered on, then, electric power is supplied to the various parts of the camera 100 starting up the camera 100. In step S942, the power detection circuit 203 of the cradle 200 makes judgment depending on a voltage level of the power connector 250 whether or not the camera 100 is attached to the cradle 200.

As a result, if judgment is made that the camera 100 is attached to the cradle 200, then, the operation goes to step S943. On the contrary, if judgment is made that the camera 100 is not attached to the cradle 200, then, the operation goes to step S950.

In step S943, the power supply circuit 202 is notified with information on power-on from the power detection circuit 203 and supplies electric power to the various parts of the cradle 200. Particularly, the charging circuit 204 is supplied with electric power necessary for the charging. The charging circuit 204 supplies electric power to the rechargeable battery 122 of the camera 100 using electric power supplied from the power supply circuit 202 for performing the charging.

Further, upon detection of the beginning of the charging to the rechargeable battery 122 depending on the battery level or the like of the rechargeable battery 122, the CPU 124 allows image data, recorded in the flash memory 133, to be transferred to the HDD 220 via the data connectors 160, 260 and the system bus 240 intervening the system bus 140.

When this takes place, image data may also be multiplexed by the multiplexer 130 and transferred to the cradle 200. In such a case, the demultiplexer 230 of the cradle 200 demultiplexes multiplexed image data and the control circuit 210 executes control to allow the resulting demultiplexed image data to be transferred to and recorded in the HDD 220.

Further, the rotational speed of the platter 305 is set to a value of, for instance, 7200 rpm for modes in which image data is being recorded in or read out from the HDD 220.

Next, in step S944, judgment is made whether or not the operating section 129 is operated and a command for image pickup is made. As a result, if judgment is made that no command for image pickup is made, then, the operation is returned to step S942 for repeated executions of rest operations subsequent to step S942.

On the contrary, if judgment is made that the command for image pickup is made, then, the operation goes to step S945 wherein the camera 100 picks up an image and resulting image data, corresponding to the pickup image, is supplied to the CPU 124. Image data, supplied to the CPU 124, is supplied to the RAM 132 once for compression in JPEG and MPEG or the like. Then, judgment is made whether or not the flash memory 133 has a probability of overflow.

That is, judgment is made whether or not the flash memory 133 remains in a status with no available memory needed for recording image data compressed by the RAM 132 with the resultant incapability of recording image data in the flash memory 133.

As a result, if judgment is made that the flash memory 133 has no adequate available memory with the resultant incapability of recording image data in the flash memory 133, then, the operation goes to step S946. In step S946, judgment is made whether or not the camera 100 is under a status for recording a voice fetched by the microphone 120.

This judgment can be set using the voice input setting section 521 and executed based on preset information recorded in the RAM 132. For instance, in a case where the RAM 132 is recorded with preset information representing an operation mode being set for picking up a moving image with a voice, the CPU 124 judges that a fetched voice is recorded.

As a result of this judgment, if judgment is made that the camera 100 does not record the voice fetched by the microphone 120, the operation goes to step 947 in which the resulting image data is supplied to and recorded in the HDD 220 on a real time basis. When this takes place, the platter 305 of the HDD 220 is rotatably driven at a speed of, for instance, 7200 rpm.

In contrast, if judgment is made that the camera 100 records the voice fetched by the microphone 120, the operation goes to step 948 in which the control circuit 210 alters the rotational speed (for a readout speed) of the platter 305 to a speed of, for instance, 3600 rpm.

Subsequently, in step S949, the CPU 124 allows image data, recorded in the RAM 132, to be transferred to the cradle 200 and pickup image data is recorded in the HDD 220 of the cradle 200 on a real time basis. In this moment, the rotational speed of the platter 305 of the HDD 220 is set to the speed of, for instance, 3600 rpm for suppressing the occurrence of noise.

In step S942, if judgment is made that no camera 100 is attached to the cradle 200, then, the operation goes to step S950 in which the CPU 124 makes judgment whether or not the operating section 129 is operated.

As a result, if judgment is made that no operating section 129 is not operated, then, the operation proceeds to step S942 for repeated executions of rest operations subsequent to step S942. On the contrary, if judgment is made that the operating section 129 is operated, then, the operation proceeds to step S951.

Further, on step S945, if judgment is made that no probability of overflow occurs in the flash memory 133 (with an available memory necessary for recording pickup image data), then, the operation goes to step S951.

In step S951, judgment is made whether or not a voice, fetched by the microphone 120 of the camera 100, is being recorded. As a result, if judgment is made that the voice, fetched by the microphone 120 of the camera 100, is not being recorded, then, the operation proceeds to step S952.

In step S952, image data, picked up by the camera 100, is supplied to and recorded in the HDD 220. In this moment, the rotational speed of the platter 305 of the HDD 220 is set to a speed of, for instance, 7200 rpm.

In contrast, if judgment is made in step S951 that the voice, fetched by the microphone 120 of the camera 100, is being recorded, the operation goes to step S953. In step S953, the control circuit 210 alters the rotational speed (for a readout speed) of the platter (not shown) of the HDD 633 to a speed of, for instance, 3600 rpm.

Subsequently, in step S954, the CPU 124 transfers compressed image data, recorded in the RAM 132, to the HDD 633 of the camera 100. That is, picked up image data is recorded in the HDD 633 of the camera 100. In this moment, the rotational speed of the platter of the HDD 633 is set to the speed of, for instance, 3600 rpm for suppressing the occurrence of noise.

Upon completion of operations in step S947, or step S949 or step S954, the operation goes to step S955 in which the CPU 124 makes judgment whether or not the camera 100 is powered off. As a result, if judgment is made that the camera 100 is not powered off, the operation is returned to step S942 for repeated executions of rest operations subsequent to step S942.

On the contrary, if judgment is made in step S955 that the camera 100 is powered off, then, the current operation is terminated.

The camera 100 and the cradle 200 of the embodiment according to the present invention may conceivably have applications in, for instances, wedding ceremonies, athletic meets, shootings on long-term conferences or the like or monitoring cameras. Moreover, other applications may conceivably include a large number of situations that need achieving serial shooting of still images with high capacity or shooting of moving images with high capacity with required mobility.

For instance, a method of the application in a wedding ceremony is explained in an example listed below. First, the cradle 200 is attached to a tripod and set at an angle to take a view over an entire wedding hall. During entry of bride and groove, an image is picked up with the camera 100 in hand and, during a pleasant talk, the camera 100 is attached to the cradle 200 mounted on the tripod for achieving the charging, while allowing the serial shooting of appearance on the wedding hall in still images with high capacity or allowing the shooting of moving images with high capacity to cause the resulting image data to be recorded in the HDD 220 of the cradle 200. Further, upon utilizing the meantime, image data, picked up during a preceding entry, is shifted to the HDD 220 of the cradle 200.

Then, during a cake-cutting scene, the camera 100 is removed from the cradle 200 and an image is picked up. When this takes place, the rechargeable battery 122 of the camera 100 has been already charged to a level higher than that in an earlier stage and, also, the flash memory 133 has an increased available memory. Accordingly, the image pickup can be performed with the camera 100 in hand with a light heart. The above actions may be repeatedly executed in compliance with scenes whose images need to be picked up until a record capacity of the HDD 220 becomes full with pickup image data.

When the record capacity of the HDD 220 is full of pickup image data, the HDD 220 can be coupled to a computer via the USB 201 to allow image data, recorded in the HDD 220, to be transferred to the computer and, subsequently, image data can be erased or the HDD 220 may be replaced by another HDD 220 with the HDD 220 being replaceable.

As set forth above, even if record medium (flash memory 133 or HDD 633) has a capacity full of image data, the camera 100 can be attached to the cradle 200 to allow image data, already recorded in record medium (flash memory 133 or HDD 633), to be shifted to the cradle 200 and image data, currently picked up, can be recorded on the HDD 220 of the cradle 200 on a real time basis.

Accordingly, pickup image data can be backed up without interruption in the shooting and, during a period in which the camera 100 is attached to the cradle 200, still images with high capacity or moving images with high capacity can be performed without minding a remaining available memory of record medium (flash memory 133 or HDD 633).

Further, as the camera 100 is removed from the cradle 200, record medium (flash memory 133 or HDD 633) of the camera 100 has an increased available memory and an image can be picked up with the camera 100 in hand with a light heart.

Thus, the shooting with a body of the camera 100 in hand, the shooting with high capacity with the camera 100 attached to the cradle 200 and the backup of record medium inside the body of the camera 100 can be performed with increased mobility.

Further, the image pickup device and the external record device of the present invention may have applications to a system comprised of a plurality of equipments (such as, for instance, a host computer, an interface equipment, a reader and a printer or the like) or to an apparatus composed of a single equipment (such as, for instance, a copying machine and facsimile device).

Furthermore, a scope of the present invention may include an embodiment in which a computer, incorporated in a device or system connected to various devices for operating the same so as to realize the functions of the embodiments mentioned above, is supplied with program codes of software for realizing the functions of the embodiments set forth above to allow the computer (CPU or MPU) of the device or system to operate in accordance with stored programs for thereby operating the various devices mentioned above.

Such a case results in a consequence of the program codes per se of software mentioned above realizing functions of the embodiment set forth above and, thus, the present invention may include the program codes per se and means such as, for instance, record medium storing such program codes for supplying the program codes to the computer. Record medium for storing such program codes may include, for instance, a flexible disk, a hard disk, an optical disk, a magneto optical disk, a CD-ROM, a magnetic tape, a non-volatile memory card and a ROM or the like.

Moreover, it is needless to say that the embodiment of the present invention now on filing involves the program codes even in a case where the computer executes the supplied program codes whereby not only the functions of the embodiments mentioned above are realized but also the functions of the embodiments mentioned above are realized with such program codes in cooperation with an OS (Operating System), operating in the computer, or other application software or the like.

In addition, it is needless to say that the present invention now on filing involves a case wherein upon storing supplied program codes in a memory equipped in a function extensions board of a computer or a function extensions unit coupled to the computer, a CPU or the like, incorporated in the function extensions board or the function extensions unit, executes a part or a whole of real operations to allow these operations to realize the functions of the embodiments mentioned above.

Also, with the embodiments set forth above, while the various control programs are stored in the ROM 131 of the camera 100, a whole of or a part of the control programs may be stored in the control circuit 210 or the like of the cradle 200.

Besides, while the embodiments set forth above are arranged to allow record medium inside the cradle 200 to include the HDD 220, another record medium may be used including an optical disk, a magneto optical disk and a non-volatile memory card or the like.

Further, while the above description has been made with reference to image data all of which are compressed in JPEG or MPEG on the RAM 132 under control of the CPU 124, image data may not be compressed treated as RAW data such that RAW data is recorded intact. In such a case, image data may not conceivably pass through the RAM 132.

Furthermore, while with the above embodiments, image data has been automatically transferred by the CPU 124 or under control of the control section 210, an alternative may take, of course, a structure to enable various manual settings.

Moreover, while the embodiments of the present invention have shown an example for concretizing the present invention and have corresponding relationships with inventive specified matters defined in scopes of claims as indicated below, the present invention is not limited to such definition and various modifications may be possibly implemented without departing the scope of the present invention.

That is, in claim 1, image pickup means corresponds to the image pickup section 503. Further, control means corresponds to the processing control section 513. Furthermore, connection means corresponds to, for instance, the power connectors 150 and 160. Moreover, connection detecting means corresponds to the connection detecting section 501. Also, transfer processing means corresponds to, for instance, the transfer processing section 515.

Further, in claim 3, judgment means corresponds to, for instance, the available limit memory detector section 512.

Furthermore, in claim 6, connection means corresponds to, for instance, the power connector 250 and the data connector 260. Moreover, the connection means corresponds to, for instance, the connection detecting section 501. Also, readout means corresponds to, for instance, the control circuit means 210. Additionally, saving means corresponds to, for instance, the HDD 220.

Moreover, in claim 8, image pickup means corresponds to, for instance, the image pickup section 503. Also, control means corresponds to, for instance, processing control means 513. Further, first connection means corresponds to, for instance, the power connector 150 and the data connector 160. Also, the first connection detecting means corresponds to, for instance, the connection detecting section 501. Additionally, transfer processing means corresponds to, for instance, the transfer control section 315. Second connection means corresponds to, for instance, the power connector 250 and the data connector 260. Besides, second connection detecting means corresponds to, for instance, the connection detecting section 501. Furthermore, readout means corresponds to, for instance, the control circuit 210. Also, saving means corresponds to, for instance, the HDD 220.

Moreover, in claims 9 or 12, a step of detecting whether or not an image pickup device is connected to an external device corresponds to, for instance, step S012. Also, a step of transferring image data associated with an image from given record medium of the image pickup device to the external record device in a case where the image pickup device is connected to the external record device corresponds to, for instance, step S913. Additionally, a step of storing image data in the external record device in a case where a command for an image pickup is made corresponds to, for instance, step S916. Besides, a step of storing image data in record medium of the image pickup device when the image pickup device and the external record device are not connected to each other in a case where the commanded for image pickup is made corresponds to, for instance, step S918.

Further, in claims 10 or 13, a step of detecting whether or not the image pickup device is connected to the external record device corresponds to, for instance, step S912. Furthermore, a step of transferring image data associated with the image to the external record device from given record medium of the image pickup device in a case where the image pickup device is connected to the external record device corresponds to, for instance, step S913. Moreover, a step of detecting an overflow in the record medium in the image pickup device corresponds to, for instance, step S915. In addition, a step of storing image data in the external record device when the image pickup device is connected to the external record device and the overflow occurs in record medium in a case where the command for image pickup is made corresponds to, for instance, step S916. Also, a step of storing image data in record medium in the image pickup device when the image pickup device is not connected to the external record device or even when the image pickup device is connected to the external record device and no overflow occurs in record medium in a case where the command for image pickup is made corresponds to, for instance, step S918.

Further, in claims 11 or 14, a step of detecting whether or not the image pickup device is connected to a hard disk device corresponds to, for instance, step S922. Furthermore, a step of detecting the presence of a voice input in the image pickup device corresponds to, for instance, step S926. Furthermore, a step of decreasing a platter rotational speed of a hard disk device for storage if the image pickup device is connected to the hard disk device and the image pickup device has the voice input in a case where the command for image pickup is made corresponds to, for instance, step S928.

Also, the operating sequences described with reference to the embodiments according to the present invention may be interpreted as a method including a series of these sequences and, further, interpreted as a program for executing the series of these sequences and record medium for recording the program.

INDUSTRIAL APPLICABILITY

As a utilization example of the present invention, the present invention can be applied to not only, for instance, a camera for recording image data but also to an implementation wherein data, recorded in record medium of an electronic notebook or the other mobile device adapted to enable storing of character data is transferred to record medium while performing the charging of the mobile device.

The invention claimed is:

1. An image pickup device for picking up an image of a given subject, comprising:
   image pickup means for picking up the image;
   control means for permitting image data, corresponding to the image picked up by the image pickup means, to be recorded in a given record medium or a given external record device, wherein the external record device is external to the image pickup device;
   connection means for connection to the external record device;
   the control means for detecting charging of a rechargeable power supply of the image pickup device by the external record device through the connection means; and
   transfer processing means controlled by the control means for transferring the image data, recorded in the record medium, to the external record device automatically in response to detection by the control means of the charging by the external record device.

2. The image pickup device according to claim 1, wherein the control means allows the image data, corresponding to the image picked up by the image pickup device, to be recorded in the external record device during a period in which the connection means connects the image pickup device to the external record device.

3. The image pickup device according to claim 1, further comprising:
   judgment means for making judgment depending on a size of the image data and an available memory of the record medium whether or not the record medium is able to store the image data;
   wherein the control means allows the image data to be saved in the record medium or to be transferred to the external record device through the transfer processing means depending on a judgment result of the judgment means.

4. The image pickup device according to claim 3, wherein the control means allows the image data to be recorded in the record medium regardless of whether or not the image pickup device is connected to the external record device by the connection means when the judgment means makes judgment that the record device is able to record the image data.

5. The image pickup device according to claim 4, wherein the control means is operative such that under a situation where the image pickup device is connected to the external record device through the connection means when the image data is recorded in the record medium under a given file name, other image data related to the image data is recorded in the external record device under another file name for consolidation to the image data recorded under the given file name.

6. An external record device comprising:
   connection means connectable to an image pickup device, wherein the external record device is external to the image pickup device;
   connection detecting means for detecting that the image pickup device is connected by the connection means;
   control means for controlling transfer of image data, picked up by the image pickup device, through the connection means when the connection detecting means detects that the image pickup device is connected by the connection means and based on a status of an image data recording capability of a recording medium of the image pickup device;
   saving means for saving the image data transferred by the control means, wherein the saving means comprises a hard disk device; and
   speed control means for decreasing a rotational speed of a platter forming the hard disk device when the image data transferred is saved on the hard disk device and under a condition in which a voice is recorded at the image pickup device when the image pickup device is commanded for image pickup and the connection detecting means detects that the image pickup device is connected to the external record device.

7. An image pickup system having an image pickup device for picking up an image of a given subject and an external record device for saving the image picked up by the image pickup device, wherein the external record device is external to the image pickup device,
   the image pickup device comprising:
   image pickup means for picking up the image;
   control means for allowing image data, corresponding to the image picked up by the image pickup means, to be recorded in a given record medium or the external record device;
   first connection means connectable to the external record device;
   the control means for detecting charging of a rechargeable power supply of the image pickup device by the external record device through the first connection means; and
   transfer processing means controlled by the control means for transferring the image data, recorded in the record medium, to the external record device automatically in response to detection by the control means of the charging by the external record device through the first connection means; and
   the external record device comprising:
   second connection means connectable to an image pickup device;

connection detecting means for detecting that the image pickup device is connected to the external record device by the second connection means; and saving means for saving the image data, automatically transferred by the transfer processing means, and the image data picked up by the image pickup means when the connection detecting means detects that the image pickup device is connected by the second connection means.

8. A control method for an image pickup system having an image pickup device for picking up an image of a given subject and an external record device operative to be connected to the image pickup device, wherein the external record device is external to the image pickup device, the control method comprising:

step of detecting charging of a rechargeable power supply of the image pickup device by the external record device;

step of transferring first image data, corresponding to a first image, from a given record medium of the image pickup device to the external record device automatically in response to detection of the charging by the external record device;

step of recording second image data in the external record device if the image pickup device is connected to the external record device when an image pickup is commanded to pick up a second image corresponding to the second image data; and step of recording the second image data in the record medium of the image pickup device if the image pickup device is not connected to the external record device when the image pickup is commanded to pick up the second image.

9. A control method for an image pickup system having an image pickup device for picking up an image of a given subject and an external record device operative to be connected to the image pickup device, wherein the external record device is external to the image pickup device, the control method comprising:

step of detecting charging of a rechargeable power supply of the image pickup device by the external record device;

step of transferring image data, corresponding to the image, from a given record medium of the image pickup device to the external record device automatically in response to detection by the image pickup device of the charging by the external record device;

step of detecting an overflow probability in the record medium of the image pickup device after an image is picked up by the image pickup device based on an image pickup command;

step of recording the image data in the external record device if the image pickup device is connected to the external record device and the overflow probability is detected for the record medium after the image is picked up by the image pickup device based on the image pickup command; and step of recording the image data in the record medium of the image pickup device if no overflow probability is detected in the record medium, even with the image pickup device being connected to the external record device, after the image is picked up by the image pickup device based on the image pickup command.

10. A control method for an image pickup system having an image pickup device for picking up an image of a given subject and a hard disk device operative to be connected to the image pickup device, the control method comprising:

step of detecting whether or not the image pickup device is connected to the hard disk device;

step of detecting that the image pickup device has a voice input; and step of recording the image data upon decreasing a platter rotational speed of the hard disk device if the image pickup device is connected to the hard disk device and the image pickup device has the voice input when the image pickup is commanded.

11. A computer readable medium having a program including a method executable in a computer for an image pickup system having an image pickup device for picking up an image of a given subject and an external record device operative to be connected to the image pickup device, wherein the external record device is external to the image pickup device, the method comprising:

step of detecting charging of a rechargeable power supply of the image pickup device by the external record device;

step of transferring first image data, corresponding to a first image, from a given record medium of the image pickup device to the external record device automatically in response to detection of the charging by the external record device;

step of recording second image data in the external record device if the image pickup device is connected to the external record device when an image pickup is commanded to pick up a second image corresponding to the second image data; and step of recording the second image data in the record medium of the image pickup device if the image pickup device is not connected to the external record device when the image pickup is commanded to pick up the second image.

12. A computer readable medium having a program including a method executable in a computer for an image pickup system having an image pickup device for picking up an image of a given subject and an external record device operative to be connected to the image pickup device, wherein the external record device is external to the image pickup device, the method comprising:

step of detecting by the image pickup device of charging of a rechargeable power supply of the image pickup device by the external record device;

step of transferring image data, corresponding to the image, from a given record medium of the image pickup device to the external record device automatically in response to detection by the image pickup device of the charging by the external record device;

step of detecting an overflow probability in the record medium of the image pickup device after an image is picked up by the image pickup device based on an image pickup command;

step of recording the image data in the external record device if the image pickup device connected to the external record device and the overflow probability is detected for the record medium after the image is picked up by the image pickup device based on the image pickup command; and step of recording the image data in the record medium of the image pickup device if no overflow probability is detected for the record medium, even with the image pickup device being connected to the external record device, after the image is picked up by the image pickup device based on the image pickup command.

13. A computer readable medium having a program including a control method executable in a computer for an image pickup system having an image pickup device for picking up an image of a given subject and a hard disk device operative to be connected to the image pickup device, the control method comprising:

step of detecting whether or not the image pickup device is connected to the hard disk device;

step of detecting that the image pickup device has a voice input; and step of recording the image data upon decreasing a platter rotational speed of the hard disk device if the image pickup device is connected to the hard disk device and the image pickup device has the voice input when the image pickup is commanded.

* * * * *